United States Patent
Kiyonaga et al.

(10) Patent No.: US 11,560,819 B2
(45) Date of Patent: Jan. 24, 2023

(54) COMBUSTION SYSTEM

(71) Applicants: THE CHUGOKU ELECTRIC POWER CO., INC., Hiroshima (JP); TOKYO METROPOLITAN PUBLIC UNIVERSITY CORPORATION, Tokyo (JP)

(72) Inventors: Eiji Kiyonaga, Hiroshima (JP); Kazuhiro Yoshida, Hiroshima (JP); Keiichiro Morita, Hiroshima (JP); Toru Murayama, Tokyo (JP); Masatake Haruta, Tokyo (JP); Shinichi Hata, Tokyo (JP); Yusuke Inomata, Tokyo (JP)

(73) Assignees: THE CHUGOKU ELECTRIC POWER CO., INC., Hiroshima (JP); TOKYO METROPOLITAN PUBLIC UNIVERSITY CORPORATION, Tokyo (JP)

(*) Notice: Subject to any disclaimer, the term of this patent is extended or adjusted under 35 U.S.C. 154(b) by 0 days.

(21) Appl. No.: 17/436,940

(22) PCT Filed: Mar. 7, 2019

(86) PCT No.: PCT/JP2019/009204
§ 371 (c)(1),
(2) Date: Sep. 7, 2021

(87) PCT Pub. No.: WO2020/179079
PCT Pub. Date: Sep. 10, 2020

(65) Prior Publication Data
US 2022/0127991 A1    Apr. 28, 2022

(51) Int. Cl.
*F01N 3/20*    (2006.01)
*F01N 5/02*    (2006.01)
(Continued)

(52) U.S. Cl.
CPC ............ *F01N 3/2073* (2013.01); *B01J 23/22* (2013.01); *F01N 3/035* (2013.01); *F01N 5/02* (2013.01); *F01N 2370/02* (2013.01)

(58) Field of Classification Search
CPC ........ F01N 3/2073; F01N 3/021; F01N 3/035; F01N 5/02; F01N 2370/02; B01J 23/22; F23J 15/02; F23J 15/025; F23J 2215/10; F23J 2219/10
See application file for complete search history.

(56) References Cited

U.S. PATENT DOCUMENTS

2004/0180783 A1    9/2004    Nojima et al.
2008/0182746 A1    7/2008    Matsueda et al.
(Continued)

FOREIGN PATENT DOCUMENTS

JP    S54-074270 A    6/1979
JP    S57-038939 A    3/1982
(Continued)

OTHER PUBLICATIONS

WO-2017042895 translation, Mar. 2017, Makoto et al.*

*Primary Examiner* — Phutthiwat Wongwian
*Assistant Examiner* — Diem T Tran
(74) *Attorney, Agent, or Firm* — Muncy, Geissler, Olds & Lowe, P.C.

(57) ABSTRACT

Provided is a combustion system using a catalyst having better denitration efficiency at low temperatures, during a selective catalytic reduction reaction in which ammonia is used as a reducing agent.
This combustion system comprises: a combustion device that combusts fuel; an exhaust path through which flows exhaust gas generated from the combustion of fuel in the combustion device; a dust collection device that is arranged on the exhaust path and collects ash dust/dust in the exhaust gas; and a denitration device that is arranged on the exhaust path and removes nitrogen oxides from the exhaust gas by (Continued)

means of a denitration catalyst, wherein the denitration device is arranged downstream of the dust collection device on the exhaust path, and the denitration catalyst contains vanadium oxide including vanadium pentoxide and has a defect site in which an oxygen atom is deficient in a crystal structure of the vanadium pentoxide.

5 Claims, 22 Drawing Sheets

(51) Int. Cl.
    *B01J 23/22*     (2006.01)
    *F01N 3/035*     (2006.01)

(56) References Cited

U.S. PATENT DOCUMENTS

| | | | |
|---|---|---|---|
| 2008/0234126 A1* | 9/2008 | Hong | B01D 53/8628 502/350 |
| 2012/0070763 A1 | 3/2012 | Monden et al. | |
| 2015/0224486 A1 | 8/2015 | Bauer et al. | |
| 2017/0225119 A1* | 8/2017 | Mahecha-Botero | B01D 53/145 |
| 2018/0238214 A1* | 8/2018 | Kulkarni | F02C 9/28 |
| 2018/0272278 A1 | 9/2018 | Kiyonaga et al. | |
| 2018/0272318 A1 | 9/2018 | Kiyonaga et al. | |
| 2021/0194015 A1 | 6/2021 | Yoshii et al. | |

FOREIGN PATENT DOCUMENTS

| | | |
|---|---|---|
| JP | H11-34233-7 A | 12/1999 |
| JP | 2000-197822 A | 7/2000 |
| JP | 2004-275852 A | 10/2004 |
| JP | 2007-167780 A | 7/2007 |
| JP | 2015-530921 A | 10/2015 |
| JP | 6093101 B | 3/2017 |
| JP | 6410202 B2 | 10/2018 |
| WO | WO-2010/131636 A1 | 11/2012 |
| WO | WO-2014/027207 A1 | 2/2014 |
| WO | WO-2017/042895 A1 | 3/2017 |
| WO | WO-2018/198852 A1 | 11/2018 |

* cited by examiner

COMBUSTION SYSTEM

TECHNICAL FIELD

The present invention relates to a combustion system. In more detail, the present invention relates to a combustion system which purifies exhaust gas produced by fuel combusting, using a denitration catalyst.

BACKGROUND ART

As one of the pollutants discharged into air by the combustion of fuel, nitrogen oxides (NO, $NO_2$, $NO_3$, $N_2O$, $N_2O_3$, $N_2O_4$, $N_2O_5$) can be exemplified.
The nitrogen oxides induce acid rain, ozone layer depletion, photochemical smog, etc., and have a serious influence on the environment and human bodies; therefore, treatment thereof is an important problem.

As technology for removing the above-mentioned nitrogen oxides, the selective catalytic reduction reaction ($NH_3$—SCR) with ammonia ($NH_3$) as the reductant has been known. As disclosed in Patent Document 1, a catalyst using titanium oxide as the carrier and supporting vanadium oxide is being widely used as the catalyst used in the selective catalytic reduction reaction. Titanium oxide has low activity for sulfur oxides, and has high stability; therefore, it is best established as the carrier.

On the other hand, although vanadium oxide plays a main role in $NH_3$—SCR, since it oxidizes $SO_2$ to $SO_3$, it has not been able to support on the order of 1 wt, or more of vanadium oxide.
In addition, with conventional $NH_3$—SCR, since the catalyst made by supporting vanadium oxide on a titanium oxide carrier almost does not react at low temperature, it must be used at high temperatures such as 350 to 400° C.
However, in order to raise the degrees of freedom of design in devices and facilities realizing $NH_3$—SCR and make more efficient, the development of a catalyst exhibiting high nitrogen oxide reduction rate activity at low temperatures has been demanded.

Subsequently, the present inventors have found a denitration catalyst in which vanadium pentoxide is present in at least 43 wt %, having a BET specific surface area of at least 30 $m^2/g$, and which can be used in denitration at 200° C. or lower (Patent Document 2).

Patent Document 1: Japanese Unexamined Patent Application, Publication No. 2004-275852
Patent Document 2: Japanese Patent No. 6093101

DISCLOSURE OF THE INVENTION

Problems to be Solved by the Invention

The present inventors, as a result of thorough research trying to achieve a further improvement of the above Patent Document 2, found a denitration catalyst exhibiting a more superior reduction rate activity of nitrogen oxides.

The present invention has an object of providing a combustion system using a catalyst having better denitration efficiency at low temperature compared to the conventional technology, upon the selective catalytic reduction reaction with ammonia as the reductant.

Means for Solving the Problems

The present invention relates to a combustion system including: a combustion device which combusts a fuel; an exhaust channel through which exhaust gas generated by the fuel combusting in the combustion device flows; a dust collector which is disposed in the exhaust channel, and collects ash dust in the exhaust gas; and a denitration device which is disposed in the exhaust channel, and removes nitrogen oxides from the exhaust gas by way of a denitration catalyst, in which the denitration device is disposed on a downstream side of the dust collector in the exhaust channel, and the denitration catalyst contains vanadium oxide, the vanadium oxide including vanadium pentoxide, and the denitration catalyst has a defect site at which oxygen atoms are deficient in the crystal structure of the vanadium pentoxide.

In addition, it is preferable for the combustion system to further include an air preheater disposed in the exhaust channel, and recovers heat from the exhaust gas, and the air preheater to be disposed on an upstream side of the dust collector.

In addition, the present invention relates to a combustion system including: a combustion device which combusts a fuel; an exhaust channel through which exhaust gas generated by the fuel combusting in the combustion device flows; an air preheater which is disposed in the exhaust channel, and recovers heat from the exhaust gas; and a denitration device which is disposed in the exhaust channel, and removes nitrogen oxides from the exhaust gas by way of a denitration catalyst, in which the denitration device is disposed on a downstream side of the air preheater in the exhaust channel, and the denitration catalyst contains vanadium oxide, the vanadium oxide including vanadium pentoxide, and the denitration catalyst has a defect site at which oxygen atoms are deficient in the crystal structure of the vanadium pentoxide.

In addition, the present invention relates to a combustion system including: an internal combustion engine which combusts a fuel; an exhaust channel through which exhaust gas generated by the fuel combusting in the internal combustion engine flows; an exhaust heat recovery device which is disposed in the exhaust channel and recovers exhaust heat from exhaust gas discharged from the internal combustion engine; and a denitration device which is disposed in the exhaust channel, and removes nitrogen oxides from the exhaust gas by way of a denitration catalyst, in which the denitration device is disposed on a downstream side of the exhaust heat recovery device in the exhaust channel, and the denitration catalyst contains vanadium oxide, the vanadium oxide including vanadium pentoxide, and the denitration catalyst has a defect site at which oxygen atoms are deficient in the crystal structure of the vanadium pentoxide.

In addition, it is preferable for the exhaust heat recovery device to include a turbine device and an exhaust gas economizer, in which the exhaust gas economizer generates steam with exhaust gas discharged from the internal combustion engine and exhaust gas supplied from the turbine device as heat sources, and the turbine device conducts power generation using the exhaust gas discharged from the internal combustion engine and steam supplied from the exhaust gas economizer.

Effects of the Invention

A combustion system according to the present invention has better denitration efficiency at low temperature compared to the conventional technology, upon the selective catalytic reduction reaction with ammonia as the reductant.

PREFERRED MODE FOR CARRYING OUT THE INVENTION

Figure 1A:
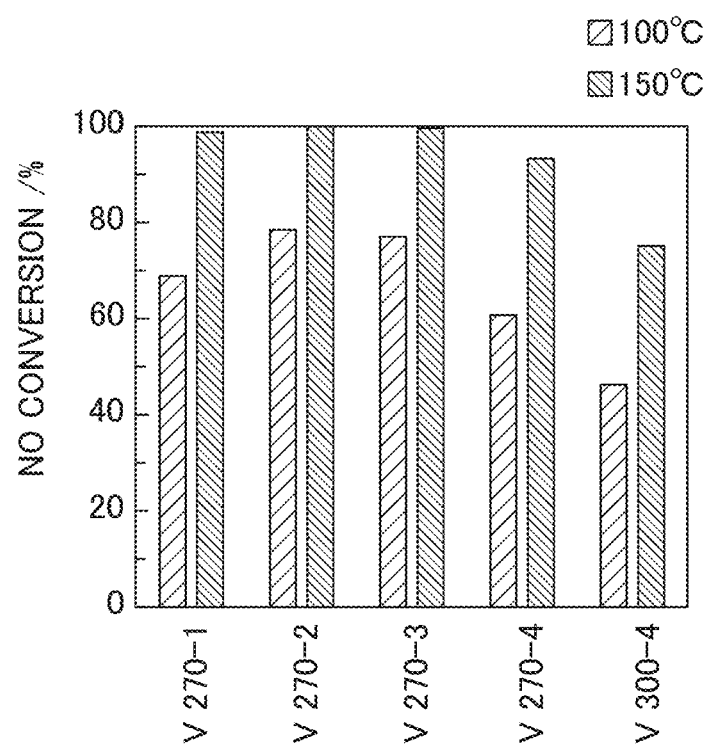
FIG. 1A is a graph showing the NO conversion rates of catalysts according to each of the Examples and Comparative Examples.

Hereinafter, embodiments of the present invention will be explained.

The denitration catalyst of the present invention is a denitration catalyst containing vanadium oxide, in which this vanadium oxide includes vanadium pentoxide, and has defect sites at which oxygen atoms are deficient in the crystal structure of this vanadium pentoxide.

Such a denitration catalyst can exhibit a high denitration effect even under a low temperature environment, compared to a denitration catalyst such as a vanadium/titanium catalyst which is conventionally used.

Firstly, the denitration catalyst of the present invention contains vanadium oxide.

This vanadium oxide includes vanadium oxide (II) (VO), vanadium trioxide (III) ($V_2O_3$), vanadium tetroxide (IV) ($V_2O_4$), and vanadium pentoxide (V) ($V_2O_5$), and the V element of vanadium pentoxide ($V_2O_5$) may assume the pentavalent, tetravalent, trivalent and divalent form in the denitration reaction.

It should be noted that this vanadium oxide is a main component of the denitration catalyst of the present invention, and may contain other substances within a range no inhibiting the effects of the present invention; however, it is preferably present in at least 50 wt % by vanadium pentoxide conversion, in the denitration catalyst of the present invention.

More preferably, the vanadium oxide preferably exists in at least 65 wt, by vanadium pentoxide conversion.

More preferably, vanadium oxide is preferably present in at least 90 wt % by vanadium pentoxide conversion, in the denitration catalyst of the present invention.

Secondly, the denitration catalyst of the present invention has defect sites at which oxygen atoms are deficient in the crystal structure of vanadium pentoxide included in the above-mentioned vanadium oxide.

It should be noted that, herein, "defect site" indicates being a position (site) at which a certain type of atom is not occupied, while being a position (site) which be occupied by this certain atom in the crystal.

In the denitration catalyst of the present invention, the structure of the vanadium pentoxide crystal contained in this denitration catalyst is locally disordered due to firing at a relatively low temperature, and can exhibit high denitration effect; however, above all, it is assumed that a high denitration effect is exhibited by sites appearing at which oxygen atoms are deficient in the crystal structure of vanadium pentoxide.

It should be noted that "site at which oxygen atoms are deficient" is also abbreviated as "oxygen defect site".

It should be noted that, herein, "having a defect site at which oxygen atoms are deficient" may be the matter of the intensity ratio of peak intensity ($P_{6-13}$) on the (110) plane of $V_6O_{13}$, relative to the peak intensity ($P_{2-5}$) on the (001) plane of $V_2O_5$, detected by powder X-ray diffraction method, being at least 0.08 and no more than 2.05, as disclosed in the Examples described later.

In addition, the denitration catalyst of the present invention has a state in which the degree of crystallinity declines due to the existence of vanadium pentoxide in which the crystal structure of vanadium pentoxide included in the above-mentioned vanadium oxide contains crystal water.
In the denitration catalyst of the present invention, the structure of the vanadium pentoxide crystal included in this denitration catalyst is locally disordered by firing at relatively low temperature, and can exhibit high denitration effect; however, by the crystal structure of vanadium pentoxide and crystal water-containing vanadium pentoxide coexisting, it is assumed that high denitration effect is exhibited by inhibiting growth of vanadium pentoxide crystals, and generating a local disorder in the structure of the vanadium pentoxide crystal.

In the embodiment of the present invention, in the selective catalytic reduction reaction using the denitration catalyst in which the intensity ratio ($P_{V_6O_{13}}/P_{V_2O_5}$) of the peak intensity ($P_{V_6O_{13}}$) of the (110) plane of $V_6O_{13}$ relative to the peak intensity ($P_{V_2O_5}$) of the (001) plane of $V_2O_5$ detected by powder X-ray diffraction method of the denitration catalyst being at least 0.08 and no more than 2.05, for example, it exhibited a NO conversion rate of 61% to 79% at the reaction temperature of 100° C., and a NO conversion rate of 93% to 100% at the reaction temperature of 150° C. On the other hand, in the selective catalytic reduction reaction using the denitration catalyst in which the intensity ratio ($P_{V_6O_{13}}/P_{V_2O_5}$) of the peak intensity ($P_{V_6O_{13}}$) of the (110) plane of $V_6O_{13}$ relative to the peak intensity ($P_{V_2O_5}$) of the (001) plane of $V_2O_5$ detected by powder X-ray diffraction method of the denitration catalyst being 0.00, it only exhibited a NO conversion rate of 47% at the reaction temperature of 100° C., and a NO conversion rate of 76% at the reaction temperature of 150° C.

In addition, the intensity ratio ($P_{V_6O_{13}}/P_{V_2O_5}$) of the peak intensity ($P_{V_6O_{13}}$) of the (110) plane of $V_6O_{13}$ relative to the peak intensity ($P_{V_2O_5}$) of the (001) plane of $V_2O_5$ detected by powder X-ray diffraction method of the denitration catalyst is preferably at least 0.08 and no more than 2.05; however, more preferably, it may be at least 0.16 and no more than 2.05.
More preferably, it may be at least 0.16 and no more than 0.32.

In addition, herein, "having a defect site at which oxygen atoms are deficient" may be the matter of transmittance at a wavelength 1200 nm normalized with transmittance at wavelength 600 nm as 1 in ultraviolet-visible near-infrared absorption spectrum being no more than 0.90, as disclosed in the Examples described later.

In the embodiment of the present invention, for example, in the selective catalytic reduction reaction using a denitration catalyst having a reflectance at a wavelength 1200 nm normalized with reflectance at a wavelength 600 nm as 1 in ultraviolet-visible near-infrared absorption spectrum of at least 0.157 and no more than 0.901, it exhibited a NO conversion rate of 61% to 79% at a reaction temperature of 100° C., and a NO conversion rate of 93% to 100% at a reaction temperature of 150° C.

On the other hand, in the selective catalytic reduction reaction using a denitration catalyst having a reflectance at a wavelength 1200 nm normalized with reflectance at a wavelength 600 nm as 1 in ultraviolet-visible near-infrared absorption spectrum of 0.943, it only exhibited a NO conversion rate of 47% at a reaction temperature of 100° C., and a NO conversion rate of 76% at a reaction temperature of 150° C.

In addition, the reflectance of wavelength 1200 nm normalized with reflectance of wavelength 600 nm as 1 in ultraviolet-visible near-infrared absorption spectrum is preferably no more than 0.90; however, more preferably, it may be at last 0.157 and no more than 0.901.
More preferably, it may be at least 0.157 and no more than 0.813.
More preferably, it may be at least 0.700 and no more than 0.813.

In addition, herein, "having a defect site at which oxygen atoms are deficient" may be the matter of the ratio of tetravalent vanadium relative to overall vanadium of the catalyst surface detected by X-ray photoelectron spectroscopy being at least 0.20, as disclosed in the Examples described later.

In the embodiment of the present invention, in the selective catalytic reduction reaction using a denitration catalyst having a ratio of tetravalent vanadium relative to overall vanadium at the catalyst surface detected by X-ray photoelectron spectroscopy of at least 0.28 and no more than 0.40, for example, it exhibited a NO conversion rate of 61% to 79%, at a reaction temperature of 100° C., and a NO conversion rate of 93% to 100% at a reaction temperature of 150° C.

On the other hand, in the selective catalytic reduction reaction using a denitration catalyst having a ratio of tetravalent vanadium relative to overall vanadium at the catalyst surface detected by X-ray photoelectron spectroscopy of 0.19, it only exhibited a NO conversion rate of 47% at a reaction temperature of 100° C., and a NO conversion rate of 76% at a reaction temperature of 150° C.

In addition, the ratio of tetravalent vanadium relative to overall vanadium at the catalyst surface detected by X-ray photoelectron spectroscopy is preferably at least 0.20; however, more preferably, it may be at least 0.28 and no more than 0.40. More preferably, it may be at least 0.35 and no more than 0.40.

In addition, herein, "having a defect site at which oxygen atoms are deficient" may refer to the ratio (P1/P3) of the peak intensity P1 of wavenumber 450 to 550 $cm^{-1}$ originating from crosslinked V-$O_B$—V bending vibration, relative to the peak intensity P3 of wavenumber 590 to 670 $cm^{-1}$ originating from edge-sharing 3V-$O_C$ bending vibration, as described in the Examples later being no more than 1.6.
The wavenumber for calculating this "P1/P3" is the wavenumber in a case of the beginning to the end of the peak; however, in the case of calculating using the wavenumber of the peak top, it may be calculated as the ratio (P1/P3) of the peak intensity P1 of wavenumber 474 to 542 $cm^{-1}$ originating from the crosslinked V-$O_B$—V bending vibration, relative to the peak intensity P3 of wavenumber 604 to 612 $cm^{-1}$ originating from edge-sharing 3V-$O_C$ bending vibration.

In the embodiment of the present invention, for example, in the selective catalytic reduction reaction using a denitration catalyst having a ratio (P1/P3) of the peak intensity P1 of wavenumber 450 to 550 $cm^{-1}$ originating from the crosslinked V-$O_B$—V bending vibration, relative to the peak intensity P3 of wavenumber 590 to 670 $cm^{-1}$ originating from edge-sharing 3V-$O_C$ bending vibration of 0.83 to 1.43, it exhibited a NO conversion rate of 61% to 79% at the reaction temperature of 100° C., and exhibited a NO conversion rate of 93% to 100% at the reaction temperature of 150° C.

On the other hand, in the selective catalytic reduction reaction using a denitration catalyst having a ratio (P1/P3) of the peak intensity P1 of wavenumber 450 to 550 cm$^{-1}$ originating from the crosslinked V-C$_N$—V bending vibration, relative to the peak intensity P3 of wavenumber 590 to 670 cm$^{-1}$ originating from edge-sharing 3V-O$_C$ bending vibration of 1.71, it only exhibited a NO conversion rate of 47% at the reaction temperature of 100° C., and exhibited a NO conversion rate of 76% at the reaction temperature of 150° C.

In addition, the ratio (P1/P3) of the peak intensity P1 of wavenumber 450 to 550 cm$^{-1}$ originating from the crosslinked V-O$_B$—V bending vibration, relative to the peak intensity P3 of wavenumber 590 to 670 cm$^{-1}$ originating from edge-sharing 3V-O$_C$ bending vibration is preferably no more than 1.6; however, more preferably, it may be at least 0.83 and no more than 1.43.
More preferably, it may be at least 0.83 and no more than 1.09. More preferably, it may be at least 0.87 and no more than 1.09.

Furthermore, the denitration catalyst of the present invention may have a line defect in which point defects such as the "defect site at which an oxygen atoms are deficient occurs" are continuously arranged one-dimensionally, a plane defect in which the point defects are continuously arranged two-dimensionally, or a lattice defect such as lattice strain, for example.

In addition, the denitration catalyst of the present invention is preferably used in denitration at 270° C. or lower. This is derived from the firing temperature of denitration catalyst of the present invention being 270° C.
On the other hand, in the Examples described later, the denitration catalyst of the present invention exhibits high denitration effect in the selective catalytic reduction reaction at the reaction temperature of 200° C. or lower, and thus the denitration catalyst of the present invention is capable of use in denitration at 200° C. or lower.
During the selective catalytic reduction reaction, oxidation of SO$_2$ to SO$_3$ is thereby not accompanied, as in the knowledge obtained by the above Patent Document 2.

In addition, in the aforementioned disclosure, the denitration catalyst of the present invention is preferably used in denitration at 270° C. or lower; however, it may be preferably used in denitration at 200° C. or lower, and even more preferably, it may be used in denitration with a reaction temperature of 100 to 200° C. More preferably, it may be used in denitration with a reaction temperature of 160 to 200° C.
Alternatively, it may be used in denitration with a reaction temperature of 80 to 150° C.

The denitration catalyst containing vanadium oxide, and having a defect site at which oxygen atoms are deficient occurs in the crystal structure of vanadium pentoxide included in this vanadium oxide can be prepared by the sol gel method for the most part.

The sol gel method includes a step of mixing vanadate and chelate compound, and firing after dissolving this mixture in pure water.
As the vanadate, for example, ammonium vanadate, magnesium vanadate, strontium vanadate, barium vanadate, zinc vanadate, lead vanadate, lithium vanadate, etc. may be used.
In addition, as the chelate compound, for example, that having a plurality of carboxyl groups such as oxalic acid and citric acid, that having a plurality of amino groups such as acetylacetonate and ethylenediamine, that having a plurality of hydroxyl groups such as ethylene glycol, etc. may be used.

It should be noted that, in the present embodiment, after dissolving the vanadate in chelate compound and drying, it is fired at a temperature of 270° C. or less.

In the embodiment of the present invention, the denitration catalyst produced by the method including a step of dissolving ammonium vanadate in an oxalic acid aqueous solution, and a step of subsequently drying, and then firing at a temperature of 270° C., exhibited a NO conversion rate of 61 to 79% at a reaction temperature of 100° C., and exhibited a NO conversion rate of 93 to 100% at a reaction temperature of 150° C.

On the other hand, as a denitration catalyst produced by a method differing from such a process, for example, a denitration catalyst produced by a method including a step of dissolving ammonium vanadate in an oxalic acid aqueous solution, and a step of subsequently drying, and then firing at a temperature of 300° C. for 4 hours only exhibited a NO conversion rate of 47% at a reaction temperature of 100° C., and exhibited a NO conversion rate of 76% at a reaction temperature of 150° C.

The denitration catalyst prepared in this way is normally a denitration catalyst containing vanadium oxide, in which this vanadium oxide includes vanadium pentoxide, and has a defect site at which an oxygen deficiency occurs in the crystal structure of this vanadium pentoxide.

It should be noted that the present invention is not to be limited to the above embodiment, and that modifications, improvements, etc. within a scope that can achieve the object of the present invention are also encompassed by the present invention.

EXAMPLES

Hereinafter, Examples of the present invention will be specifically explained together with Comparative Examples. It should be noted that the present invention is not limited to these Examples.

1 Each Example and Comparative Example

Example 1

Ammonium vanadate was dissolved in an oxalic acid aqueous solution.
Herein, the molar ratio of ammonium vanadate:oxalic acid is 1:3. After completely dissolving, the moisture in the solution was evaporated on a hot stirrer, and was dried overnight at 120° C. in a dryer.
Subsequently, the dried powder was fired for 1 hour at 270° C. in air. The fired vanadium pentoxide was defined as the denitration catalyst of Example 1.
It should be noted that the sample name of this denitration catalyst of Example 1 was set as "V270-1".

Example 2

Ammonium vanadate was dissolved in a oxalic acid aqueous solution. Herein, the molar ratio of ammonium vanadate:oxalic acid is 1:3. After completely dissolving, the moisture in the solution was evaporated on a hot stirrer, and dried overnight at 120° C. in a dryer. Subsequently, the dried powder was fired for 2 hours at 270° C. in air. The dried vanadium pentoxide was defined as the denitration catalyst of Example 2.
It should be noted that the sample name of this denitration catalyst of Example 2 was set as "V270-2".

Example 3

Ammonium vanadate was dissolved in a oxalic acid aqueous solution. Herein, the molar ratio of ammonium vanadate:oxalic acid is 1:3. After completely dissolving, the moisture in the solution was evaporated on a hot stirrer, and dried overnight at 120° C. in a dryer. Subsequently, the dried powder was fired for 3 hours at 270° C. in air. The dried vanadium pentoxide was defined as the denitration catalyst of Example 3.

It should be noted that the sample name of this denitration catalyst of Example 3 was set as "V270-3".

Example 4

Ammonium vanadate was dissolved in a oxalic acid aqueous solution. Herein, the molar ratio of ammonium vanadate:oxalic acid is 1:3. After completely dissolving, the moisture in the solution was evaporated on a hot stirrer, and dried overnight at 120° C. in a dryer. Subsequently, the dried powder was fired for 4 hours at 270° C. in air. The dried vanadium pentoxide was defined as the denitration catalyst of Example 4.

It should be noted that the sample name of this denitration catalyst of Example 4 was set as "V270-4".

Comparative Example 1

Ammonium vanadate was dissolved in a oxalic acid aqueous solution. Herein, the molar ratio of ammonium vanadate:oxalic acid is 1:3. After completely dissolving, the moisture in the solution was evaporated on a hot stirrer, and dried overnight at 120° C. in a dryer. Subsequently, the dried powder was fired for 4 hours at 300° C. in air. The dried vanadium pentoxide was defined as the denitration catalyst of Comparative Example 1.

It should be noted that the sample name of this denitration catalyst of Comparative Example 1 was set as "V300-4".

It should be noted that this Comparative Example 1 is a denitration catalyst disclosed in Patent Document 2 noted above.

2. Evaluation

<2.1 NO Conversion Rate>
(Measurement Method 1)

Under the conditions of Table 1 below, the $NH_3$—SCR reaction was carried out using a fixed bed flow-type reactor at a reaction temperature of 100 to 200° C.

In the gas passing through the catalyst layer, NO was analyzed by a Jasco FT-IR-4700.

TABLE 1

| $NH_3$-SCR measurement conditions | |
|---|---|
| Reaction temperature | 100° C., 150° C. |
| Catalyst amount | 0.375 g |
| Gas flow rate | 250 mlmin$^{-1}$ |
| | NO: 250 ppm, $NH_3$: 250 ppm, $O_2$: 4 vol % in Ar, 2.3% $H_2O$ (steam atmosphere) |
| Space velocity | 40,000 mLh$^{-1}$g$_{cat}^{-1}$ |

In addition, the NO conversion rate was calculated by Formula (1) noted below.

It should be noted that $NO_{in}$ is the NO concentration at the reaction tube inlet, and $NO_{out}$ is the NO concentration of the reaction tube outlet.

$$NO \text{ conversion rate } [\%] = \frac{NO_{in} - NO_{out}}{NO_{in}} \times 100 \qquad \text{Formula 1}$$

(Measurement Results 1)

Table 2 shows the NO conversion rates of each vanadium pentoxide catalyst for both a case of a reaction temperature of 100° C. and a case of a reaction temperature of 150° C. FIG. 1A is a plot graphing this Table 2.

TABLE 2

NO conversion rate of vanadium catalyst

| | | NO conversion rate/% | |
|---|---|---|---|
| Sample | | 100° C. | 150° C. |
| Example 1 | (V270-1) | 69 | 99 |
| Example 2 | (V270-2) | 79 | 100 |
| Example 3 | (V270-3) | 77 | 100 |
| Example 4 | (V270-4) | 61 | 93 |
| Comparative Example 1 | (V300-4) | 47 | 76 |

In both a case of a reaction temperature of 100° C. and a case of a reaction temperature of 150° C., the denitration catalyst of the Examples exhibited a higher NO conversion rate than the denitration catalyst of the Comparative Example.

Above all, the denitration catalysts fired for 2 to 3 hours at 270° C. exhibited a high NO conversion rate.

Thereamong, Example 2 (V270-2) exhibited the highest NO conversion rate.

(Measurement Method 2)

Under the conditions of a reaction temperature of 150° C. in Table 1 above, using the catalyst of Example 2 (V270-2), the $NH_3$—SCR reaction was carried out over 80 hours by the same method as measurement method 1, under conditions in which moisture is not coexisting (dry) and 2.3 vol % moisture coexistence (2.3 vol % water).

(Measurement Results 2)

Figure 1B:
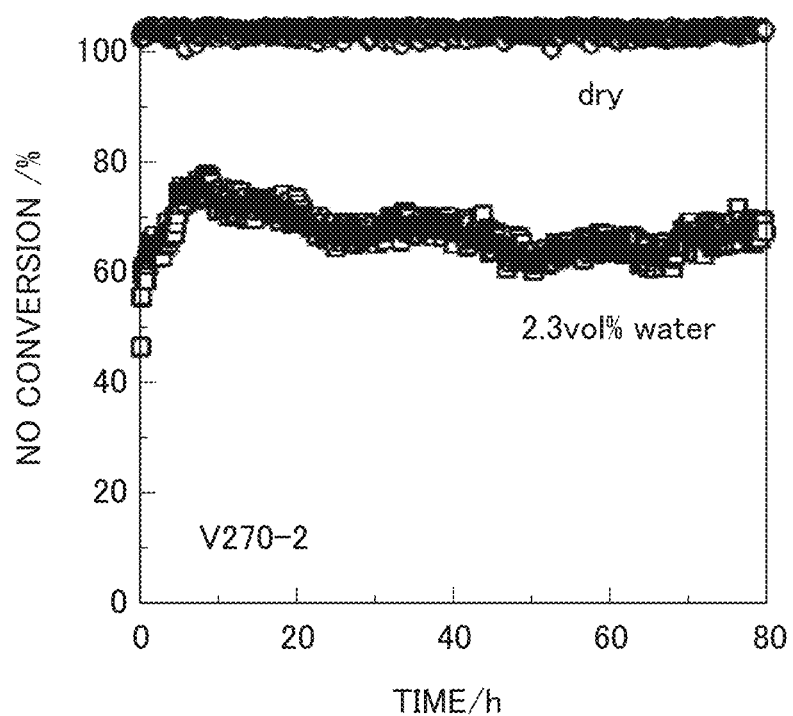
FIG. 1B is a graph showing the chronological change in NO conversion rate of the catalyst according to Example 2.

FIG. 1B is a graph showing the change in NO conversion rate at 80 hours of the catalyst of Example 2 (V270-2).

As is evident from the graph of FIG. 1B, the NO conversion rate of the catalyst of Example 2 (V270-2) showed stable numerical values over at least 80 hours in both the condition in which moisture does not coexist, and under moisture coexistence.

<2.2 TEM Images>

Figure 2A:
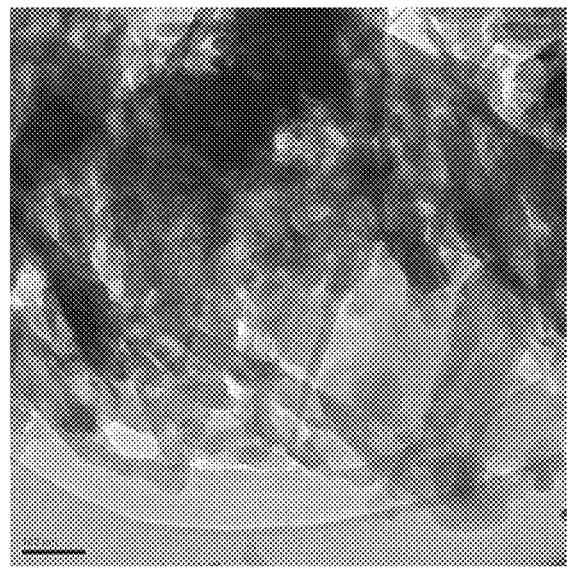
FIG. 2A is a TEM image of the catalyst according to Example 1.
Figure 2B:
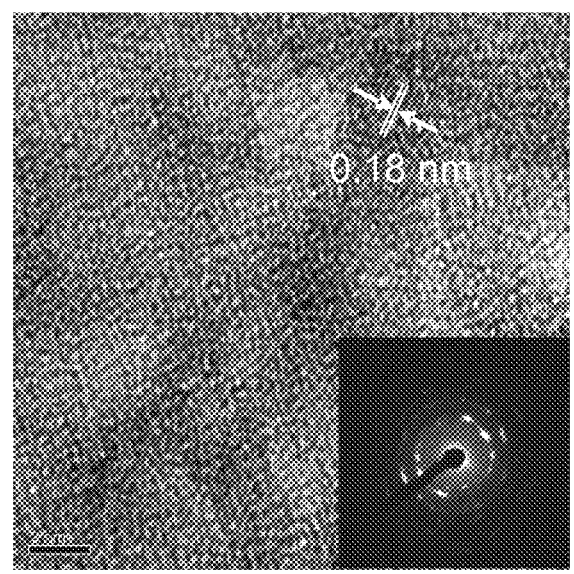
FIG. 2B is a TEM image of the catalyst according to Example 1.

FIGS. 2A and 2B show TEM images of Example 1 (V270-1). It should be noted that FIG. 2A is a TEM image of 140,000 times magnification, and FIG. 2B is a TEM image of 1,400,000 times magnification.

Figure 2C:
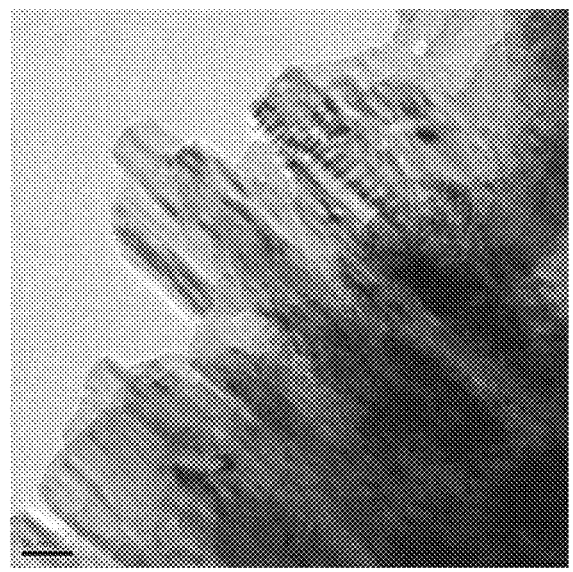
FIG. 2C is a TEM image of the catalyst according to Example 2.
Figure 2D:
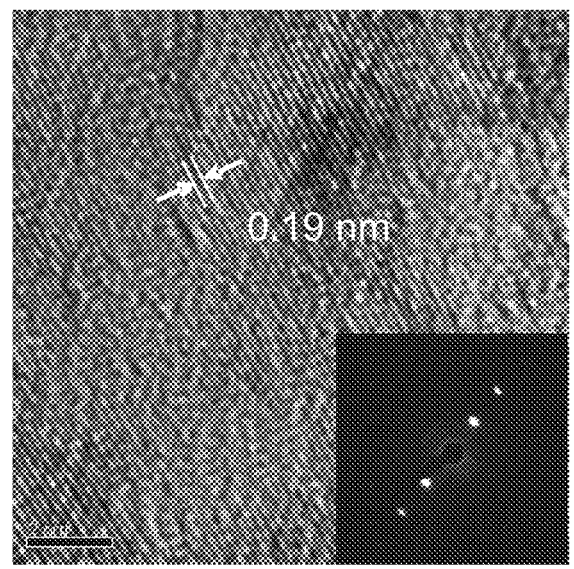
FIG. 2D is a TEM image of the catalyst according to Example 2.

In addition, FIGS. 2C and 2D show TEM images of Example 2 (V270-2). It should be noted that FIG. 2C is a TEM image of 140,000 times magnification, and FIG. 2D is a TEM image of 1,400,000 times magnification.

Figure 2E:
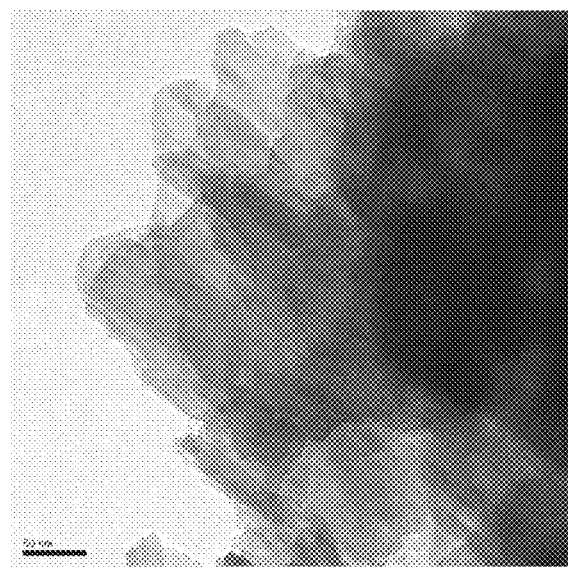
FIG. 2E is a TEM image of the catalyst according to Example 3.
Figure 2F:
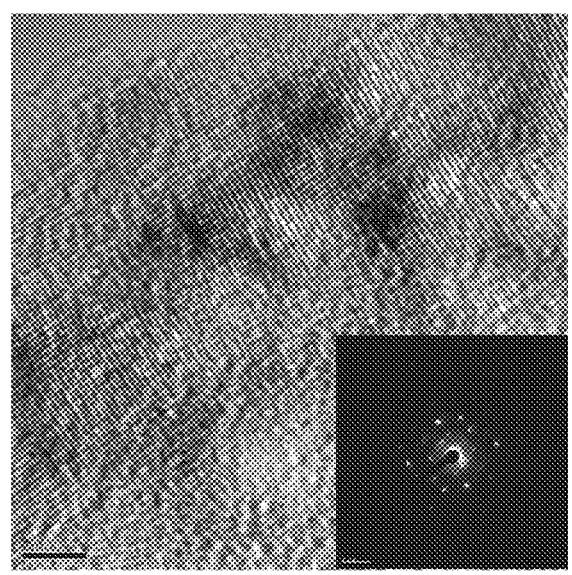
FIG. 2F is a TEM image of the catalyst according to Example 3.

In addition, FIGS. 2E and 2F show TEM images of Example 3 (V270-3). It should be noted that FIG. 2E is a TEM image of 140,000 times magnification, and FIG. 2F is a TEM image of 1,400,000 times magnification.

Figure 2G:
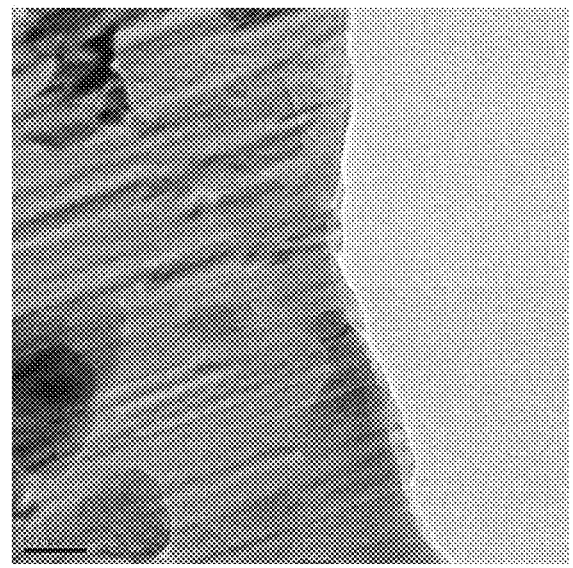
FIG. 2G is a TEM image of the catalyst according to Example 4.
Figure 2H:
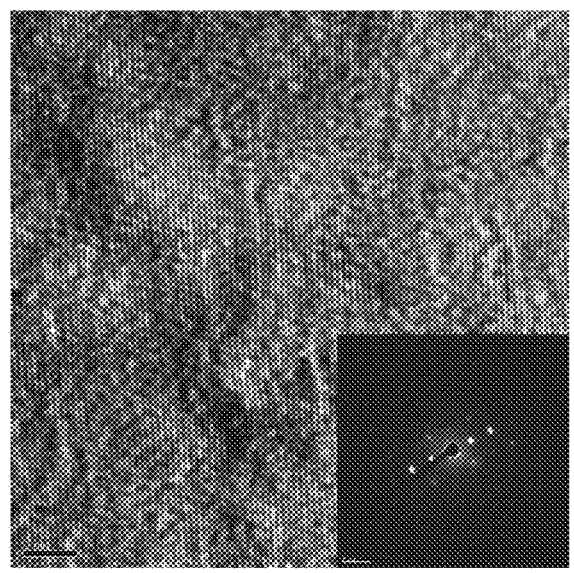
FIG. 2H is a TEM image of the catalyst according to Example 4.

In addition, FIGS. 2G and 2H show TEM images of Example 4 (V270-4). It should be noted that FIG. 2G is a TEM image of 140,000 times magnification, and FIG. 2H is a TEM image of 1,400,000 times magnification.

Figure 2I:
FIG. 2I is a TEM image of the catalyst according to Comparative Example 1.
Figure 2J:
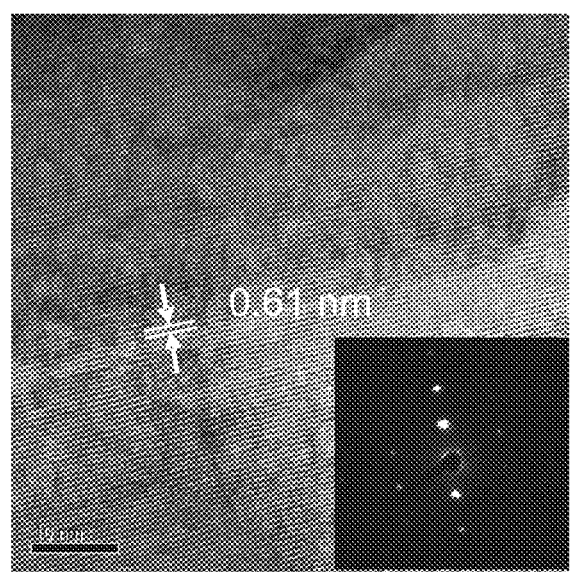
FIG. 2J is a TEM image of the catalyst according to Comparative Example 1.

On the other hand, FIGS. 2I and 2J show TEM images of Comparative Example 1 (V300-4).

It should be noted that FIG. 2I is a TEM image of 140,000 times magnification, and FIG. 2J is a TEM image of 1,400,000 times magnification.

It should be noted that the images in the lower right included in each image of FIGS. 2B, 2D, 2F, 2H and 2I show electron diffraction patterns of vanadium oxide catalysts.

From these images, it was clarified that a crystalline portion and amorphous portion exist in the crystal structure of the Examples.

<2.3 Powder X-ray Diffraction>
(Measurement Method)

As powder X-ray diffraction, measurement was performed using Cu-Kα by a Rigaku Smart Lab.
(Measurement Results)

Figure 3:
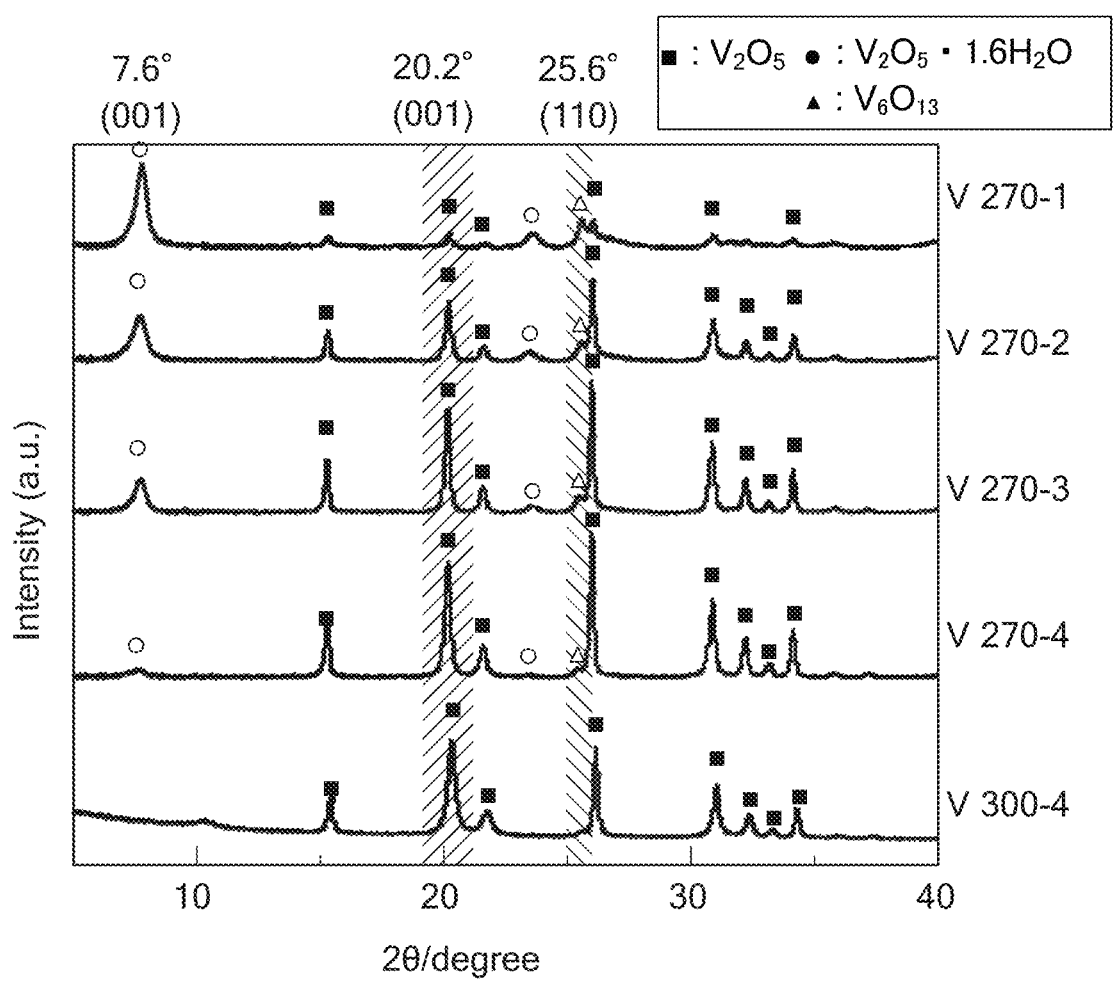
FIG. 3 is a graph showing a powder XRD pattern of each of the Examples.

FIG. 3 shows the powder XRD (X-Ray Diffraction) patterns of Example 1 (V270-1), Example 2 (V270-2), Example 3 (V270-3) and Example 4 (V270-4).

Mainly, a peak of the (001) plane of $V_2O_5 \cdot 1.6H_2O$ was found at 2θ=7.6°, a peak of the (001) plane of $V_2O_5$ was found at 2θ=20.2°, and a peak of the (110) plane of $V_6O_{13}$ was found at 2θ=25.6°.

Figure 4:
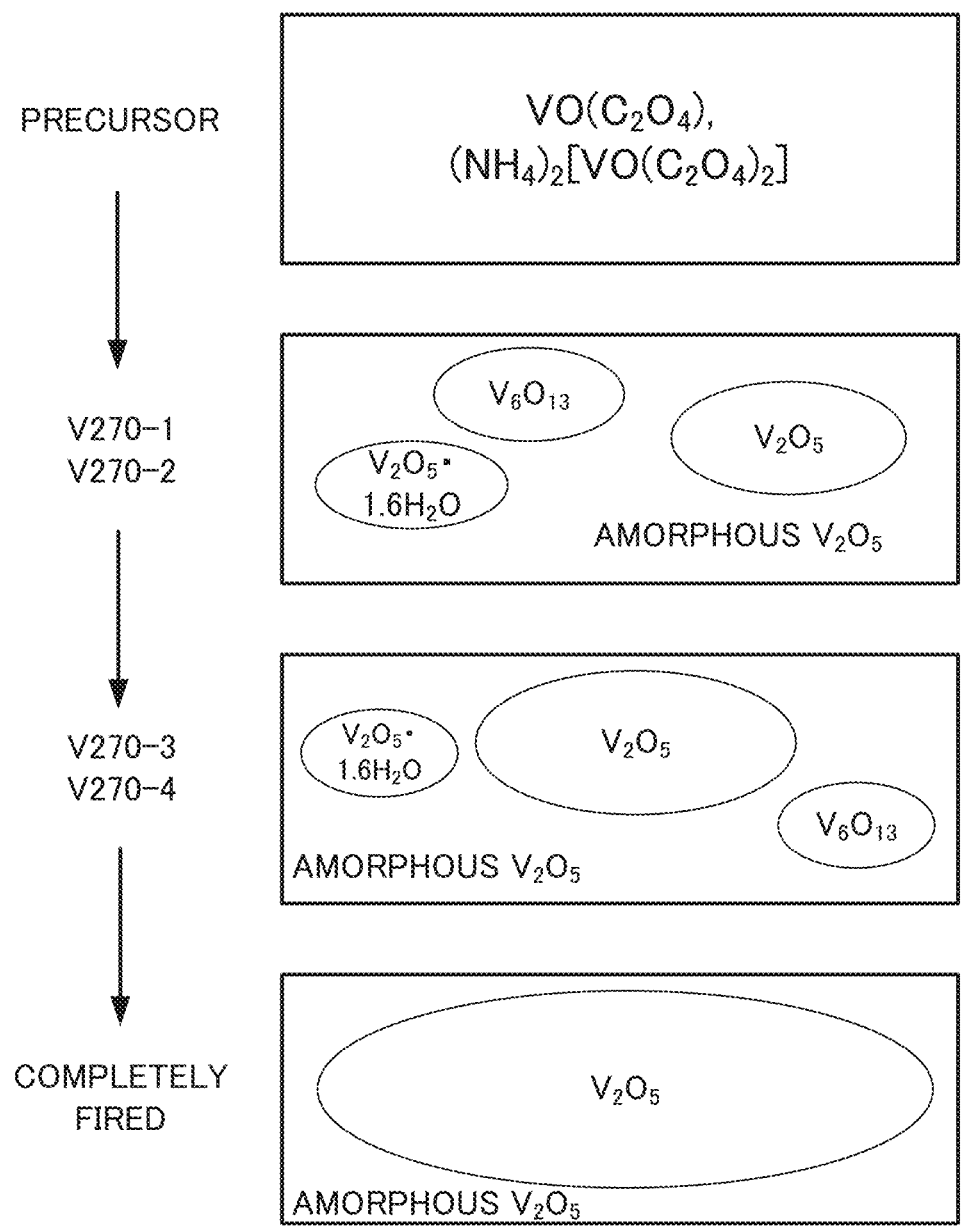
FIG. 4 is a view showing an outline of the change in internal structure in the case of firing $(NH_4)_2[VO(C_2O_4)_2]$ and $VO(C_2O_4)$.

FIG. 4 is a view showing an outline of the change in internal structure in the case of firing $VO_2(C_2O_4)$, which is the precursor. At the stage of firing at 270° C. for 1 to 2 hours, $V_2O_5 \cdot 1.6H_2O$, $V_6O_{13}$ and $V_2O_5$ are mainly generated in the denitration catalyst, and a component other than these is amorphous $V_2O_5$.

Subsequently, at the stage of firing at 270° C. for 3 to 4 hours, $V_2O_5$, $V_2O_5 \cdot 1.6H_2O$, and $V_6O_{13}$ are mainly generated in the denitration catalyst, and a component other than these is amorphous $V_2O_5$.

Eventually, at the stage completely fired, $V_2O_5$ is mainly generated in the denitration catalyst, and a component other than these is amorphous $V_2O_5$.

Therefore, for each catalyst, the intensity ratio ($P_{6-13}/P_{2-5}$) of the peak intensity ($P_{6-13}$) of the (110) plane of $V_6O_{13}$ relative to the peak intensity ($P_{2-5}$) of the (001) plane of $V_2O_5$ was calculated, and this was set as an index of each catalyst.

Figure 5:
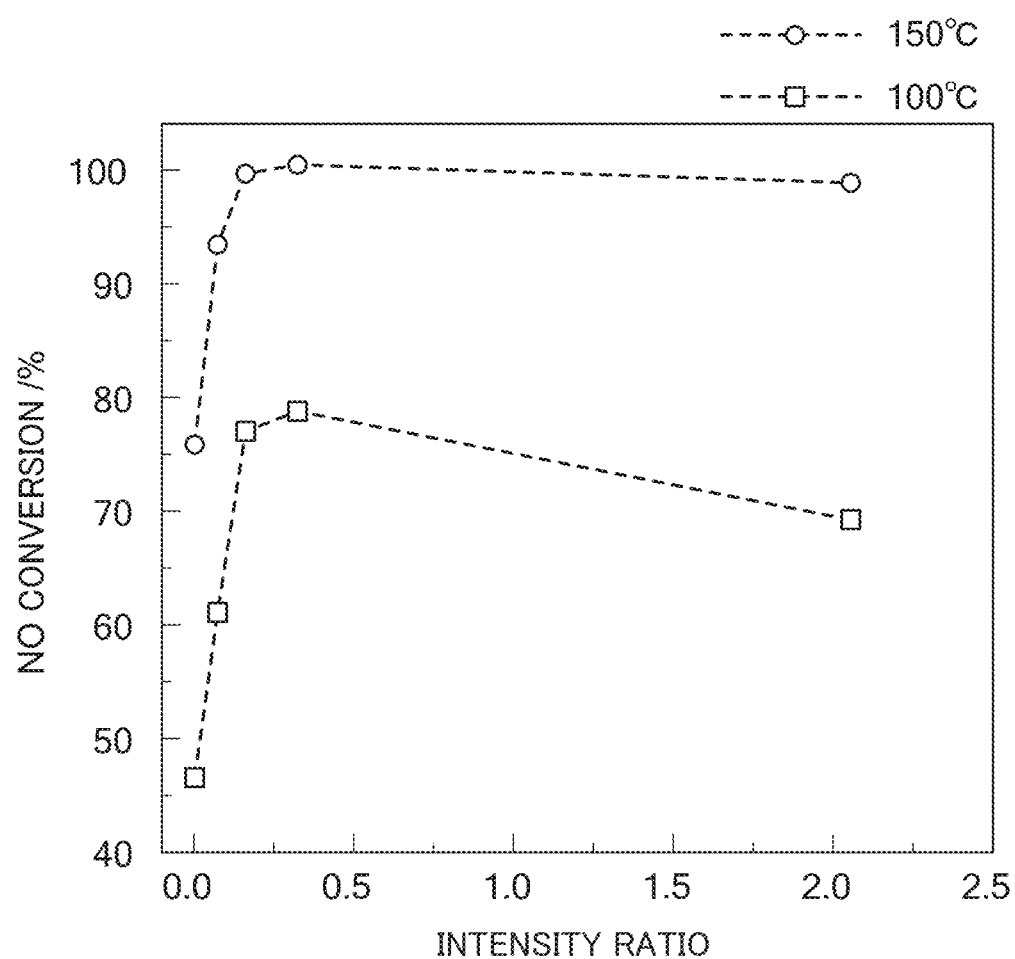
FIG. 5 is a graph showing the relationship between intensity ratio and NO conversion rate of the catalyst according to each of the Examples and Comparative Examples.

Table 3 shows the intensity ratio of each vanadium catalyst, and the NOx conversion rates for both the case of a reaction temperature of 100° C. and the case of a reaction temperature of 150° C. FIG. 5 is a plot graphing this Table 3.

TABLE 3

| NO conversion rate of vanadium catalyst | | | |
|---|---|---|---|
| | Intensity | NO conversion rate/% | |
| Sample | Ratio | 100° C. | 150° C. |
| Example 1 | (V270-1) | 2.05 | 69 | 99 |
| Example 2 | (V270-2) | 0.32 | 79 | 100 |
| Example 3 | (V270-3) | 0.16 | 77 | 100 |
| Example 4 | (V270-4) | 0.08 | 61 | 93 |
| Comparative Example 1 | (V300-4) | 0.00 | 47 | 76 |

From Table 3 and FIG. 5, it was found that the catalysts according to the Examples having an intensity ratio of at least 0.07 exhibited higher NO conversion rate than the Comparative Example.

<2.4 UV-Vis-NIR Spectra>
(Measurement Method)

The color of the vanadium catalyst itself according to the above Examples and Comparative Examples changes from green to yellow as firing progresses.

Therefore, for each catalyst, UV-Vis-NIR spectra was calculated using a diffuse reflection microscope.

In more detail, a sample of each catalyst was filled into a sample holder including a white sheet of barium sulfate, and UV-Vis-NIR spectra were measured by the diffuse reflectance method.

As the measuring apparatus, a IV-3100PC UV-visible spectrophotometer manufactured by Shimadzu was used.
(Measurement Results)

Figure 6:
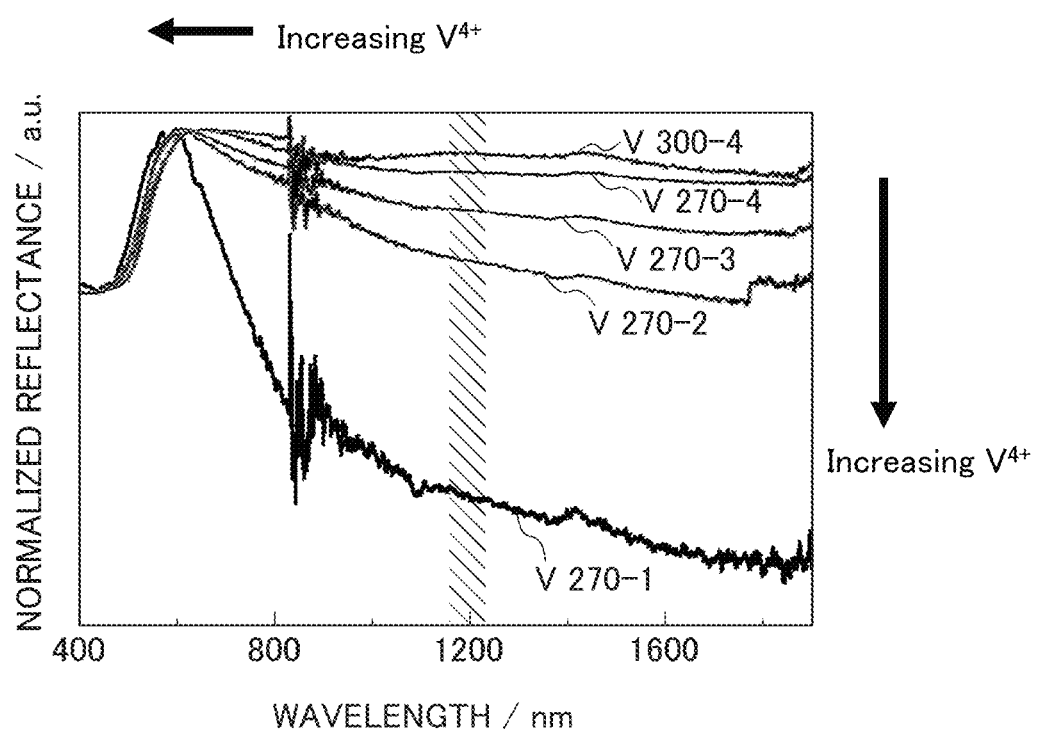
FIG. 6 is a graph showing the UV-Vis-NIR spectra of the catalyst according to each of the Examples and Comparative Examples.

FIG. 6 shows, as the UV-Vis-NIR spectra for each catalyst, a graph establishing the wavelength as the horizontal axis, and establishing the reflectance normalizing the reflectance of wavelength 600 nm as 1 as the vertical axis.

According to the graph of FIG. 6, it was shown that the value of reflectance dropped within a wide range of wavelengths after 600 nm, as the tetravalent vanadium increased.

It should be noted that Table 4 below shows the absorption edge wavelength of each catalyst and the reflectance of wavelength 1200 nm.

TABLE 4

| Absorption edge wavelength and reflectance of vanadium catalyst | | | |
|---|---|---|---|
| Sample | | Absorption edge/nm | Reflectance of 1200 nm/% |
| Example 1 | (V270-1) | 537.4 | 15.7 |
| Example 2 | (V270-2) | 547.0 | 70.0 |
| Example 3 | (V270-3) | 547.0 | 81.3 |
| Example 4 | (V270-4) | 554.7 | 90.1 |
| Comparative Example 1 | (V300-4) | 537.4 | 94.3 |

Figure 7:
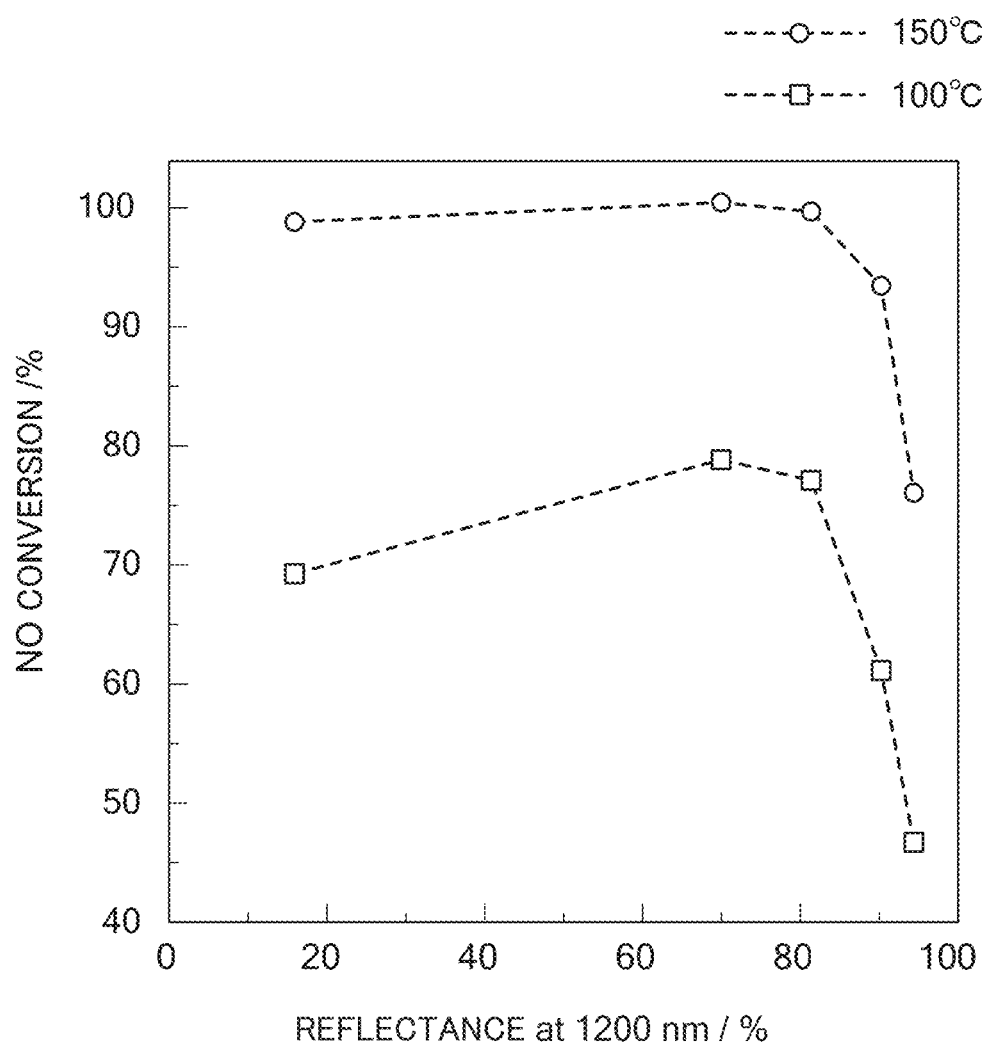
FIG. 7 is a graph showing the relationship between transmittance of wavelength 1200 nm and NO conversion rate of the catalysts according to each of the Examples and Comparative Examples.

FIG. 7 is a graph showing the relationship between the reflectance of wavelength 1200 nm of each catalyst and the NO conversion rate.

For both a case of a reaction temperature of 100° C. and a case of a reaction temperature of 150° C., the NO conversion rates of catalysts according to the Examples having a reflectance of no more than 0.90 exhibited a higher value than the NO conversion rate of the catalyst according to the Comparative Example having a reflectance exceeding 0.90.

<2.5 Raman Spectra>
(Measurement Method)

In order to analyze the crystal structure of each catalyst, the Raman spectra was measured by Raman spectroscopy. In more detail, a small amount of a sample of each catalyst was placed on a slide of glass, and the Raman spectra were measured by a Raman spectroscopic device.

As the measurement apparatus, an NRS-4100 Raman spectrophotometer manufactured by JASCO Corp. was used.
(Measurement Results)

Figure 8:
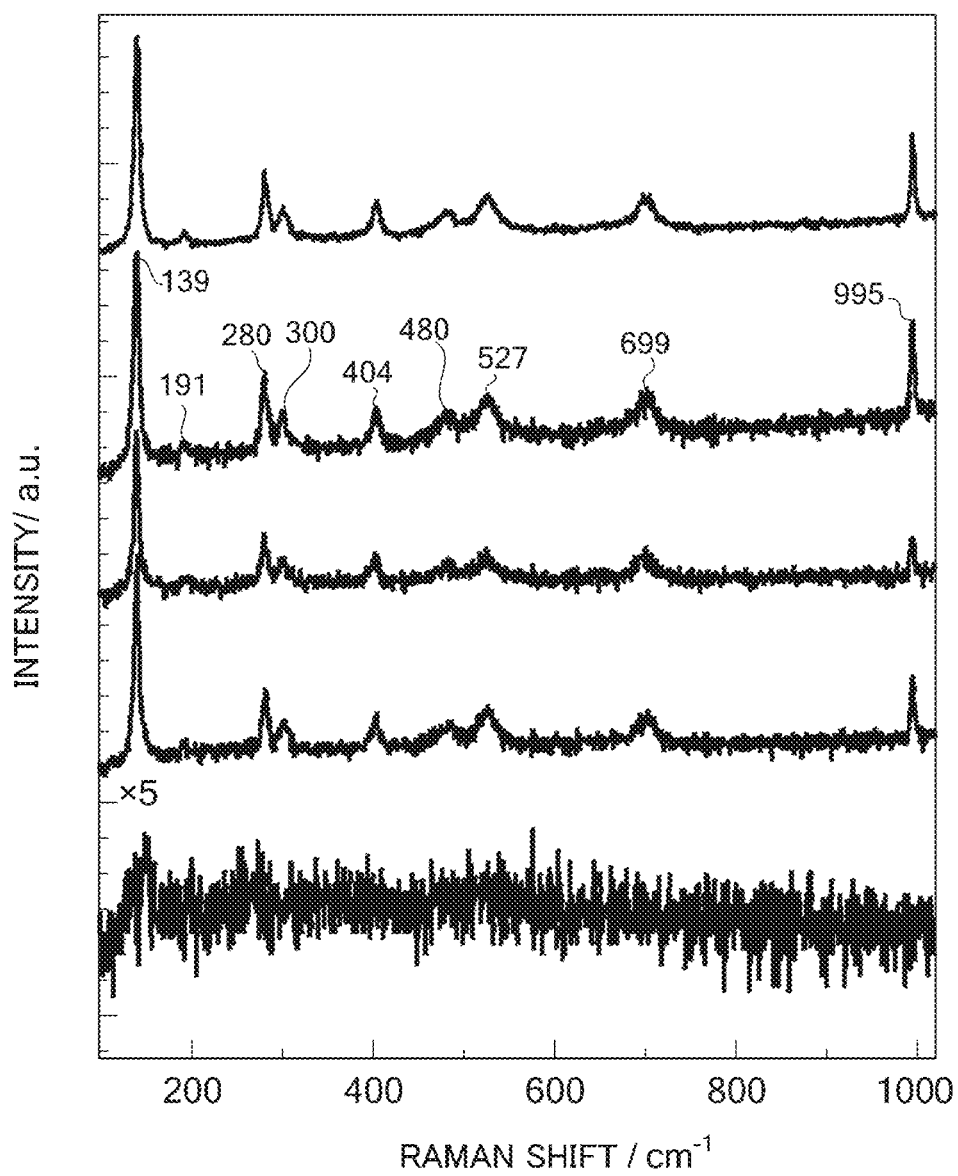
FIG. 8 is a graph showing the Raman spectra of the catalysts according to each of the Examples and Comparative Examples.

FIG. 8 shows the Raman spectra of each catalyst.

From FIG. 8, the peaks originating from the crystal structure of each catalyst could be confirmed.

Above all, it showed that there is a defect portion and a site of $V^{4+}$ in the crystal structure of each catalyst according to the Examples.

<2.6 Infrared Absorption Spectra>
(Measurement Method)

The infrared absorption spectra of each catalyst was measured. It should be noted that, upon measurement, 1 mg of sample of each catalyst and 10 mg of potassium bromide were mixed, and molded by pressurizing by a tablet molding machine.

Furthermore, infrared absorption spectra was measured by the transmission method using a TGS detector.

As the measurement apparatus, an FT/IR-6100 infrared spectrometer manufactured by JASCO Corp. was used.
(Measurement Results)

Figure 9:
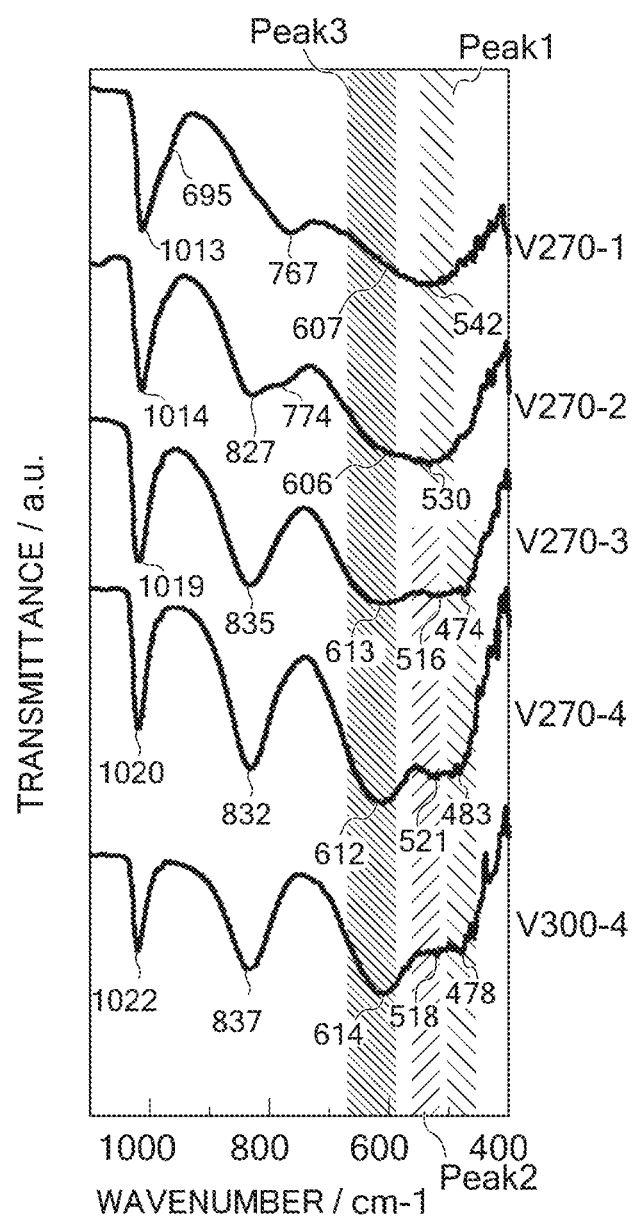
FIG. 9 is a graph showing the spectral curves obtained by measuring the infrared absorption spectra of the catalysts according to each of the Examples and Comparative Examples.

FIG. 9 shows the spectral curve of each catalyst obtained as a result of measuring the infrared absorption spectra of the finger-print region: 1150 to 400 cm$^{-1}$.

Figure 10:
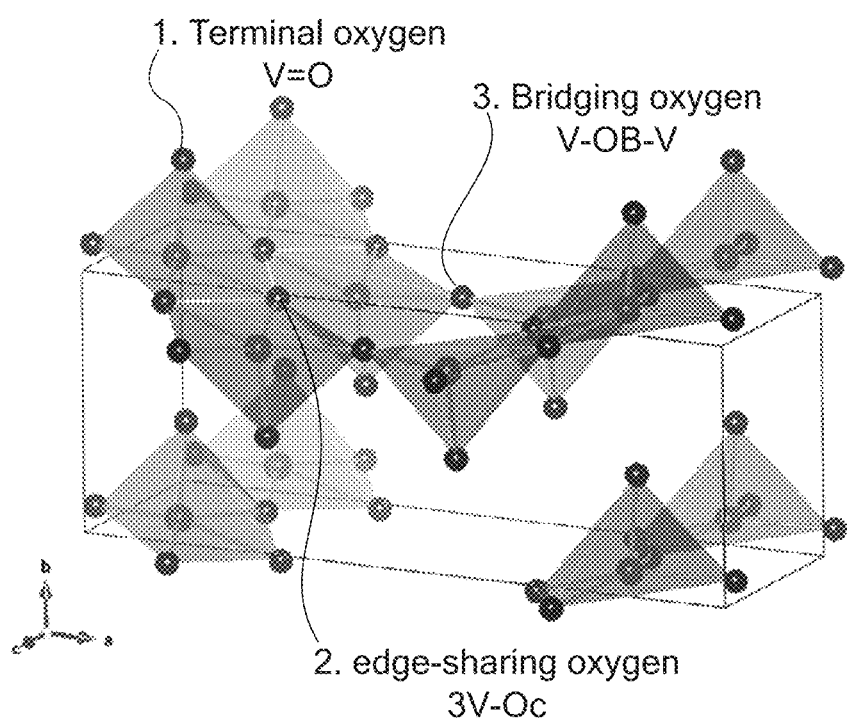
FIG. 10 is a view showing the crystal structures of vanadium pentoxide according to each of the Examples.

In addition, FIG. 10 shows crystal structures of vanadium pentoxide according to each of the Examples.

In the crystal structure of vanadium pentoxide, the terminal V=O (1 in FIG. 10), edge-shared 3V—$O_C$ (2 in FIG. 10) and crosslinked V—$O_B$—V (3 in FIG. 10) exist.

As shown in FIG. 9, the peak (Peak 1) originating from crosslinked V—$O_B$—V bending vibration overlaps the peak (Peak 2) originating from edge-shared 3V—$O_C$ stretching vibration.

Therefore, the ratio (P1/P3) of intensity P1 of the peak (Peak 1) of wavenumber 450 to 550 cm$^{-1}$ originating from the crosslinked V—$O_B$—V bending vibration relative to intensity P3 of the peak (Peak 3) of wavenumber 590 to 670 cm$^{-1}$ originating from edge-shared 3V—$O_C$ stretching vibration was calculated.

Table 5 below shows the wavenumber, transmittance and ratio of P1/P3 of each peak for every catalyst.

Figure 11:
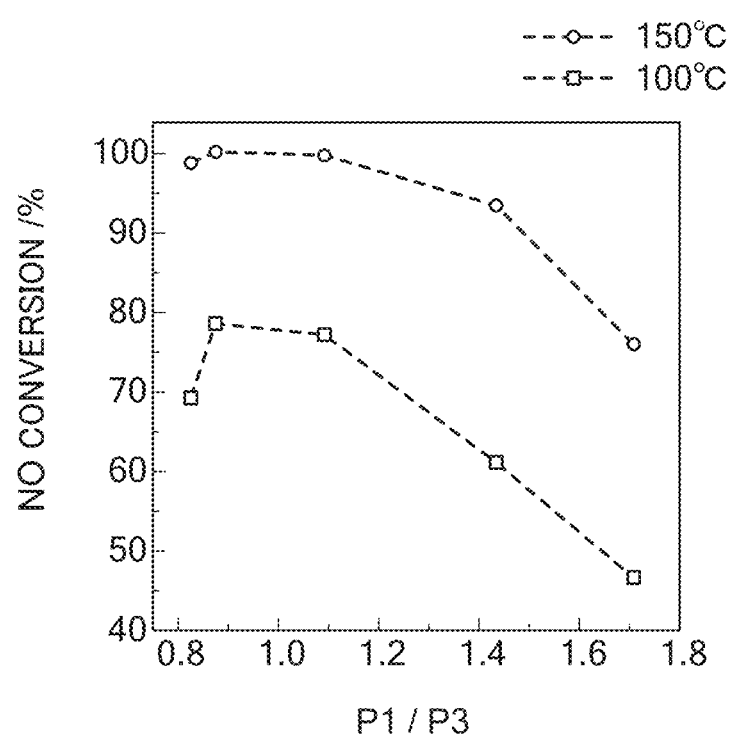
FIG. 11 is a graph establishing the ratio of P1/P3 as the horizontal axis, and establishing the NO conversion rate as the vertical axis for each of the Examples and Comparative Examples.

In addition, FIG. 11 is a graph establishing the ratio of P1/P3 in Table 5 as the horizontal axis, and establishing the NO conversion rate of each catalyst as the vertical axis.

TABLE 5

Wavenumber and transmittance of each catalyst

| Sample | Peak 3 | | Peak 2 | | Peak 1 | | |
|---|---|---|---|---|---|---|---|
| | Wave-number | transmittance (%) | Wave-number | transmittance (%) | Wave-number | transmittance (%) | P1/P3 |
| Example 1 (V270-1) | 604 | 37.6 | | | 542 | 31.0 | 0.83 |
| Example 2 (V270-2) | 606 | 28.6 | | | 530 | 25.0 | 0.87 |
| Example 3 (V270-3) | 613 | 35.2 | 516 | 37.9 | 474 | 38.5 | 1.09 |
| Example 4 (V270-4) | 612 | 24.1 | 521 | 32.9 | 483 | 34.6 | 1.43 |
| Comparative (V300-4) Example 1 | 614 | 27.9 | 518 | 47.0 | 478 | 47.7 | 1.71 |

As found from Table 5 and FIG. 11, according to the Examples, the catalysts according to the Examples having a P1/P3 of 1.6 or less showed a higher NO conversion rate than the catalyst according to the Comparative Example having a P1/P3 of 1.71.

<2.7 X-Ray Photoelectron Spectrum (XPS)>
(Measurement Method)

For the catalysts according to each of the Examples and Comparative Example, the X-ray photoelectron spectrum (XPS) was measured in order to analyze the electronic state. In more detail, powder samples of each catalyst of the Examples and Comparative Examples were fixed to a sample holder using carbon tape, and the X-ray photoelectron spectrum was measured.

As the measurement device, a JPS-9010MX photoelectron spectrometer manufactured by JEOL Ltd. was used.
(Measurement Results)

Figure 12:
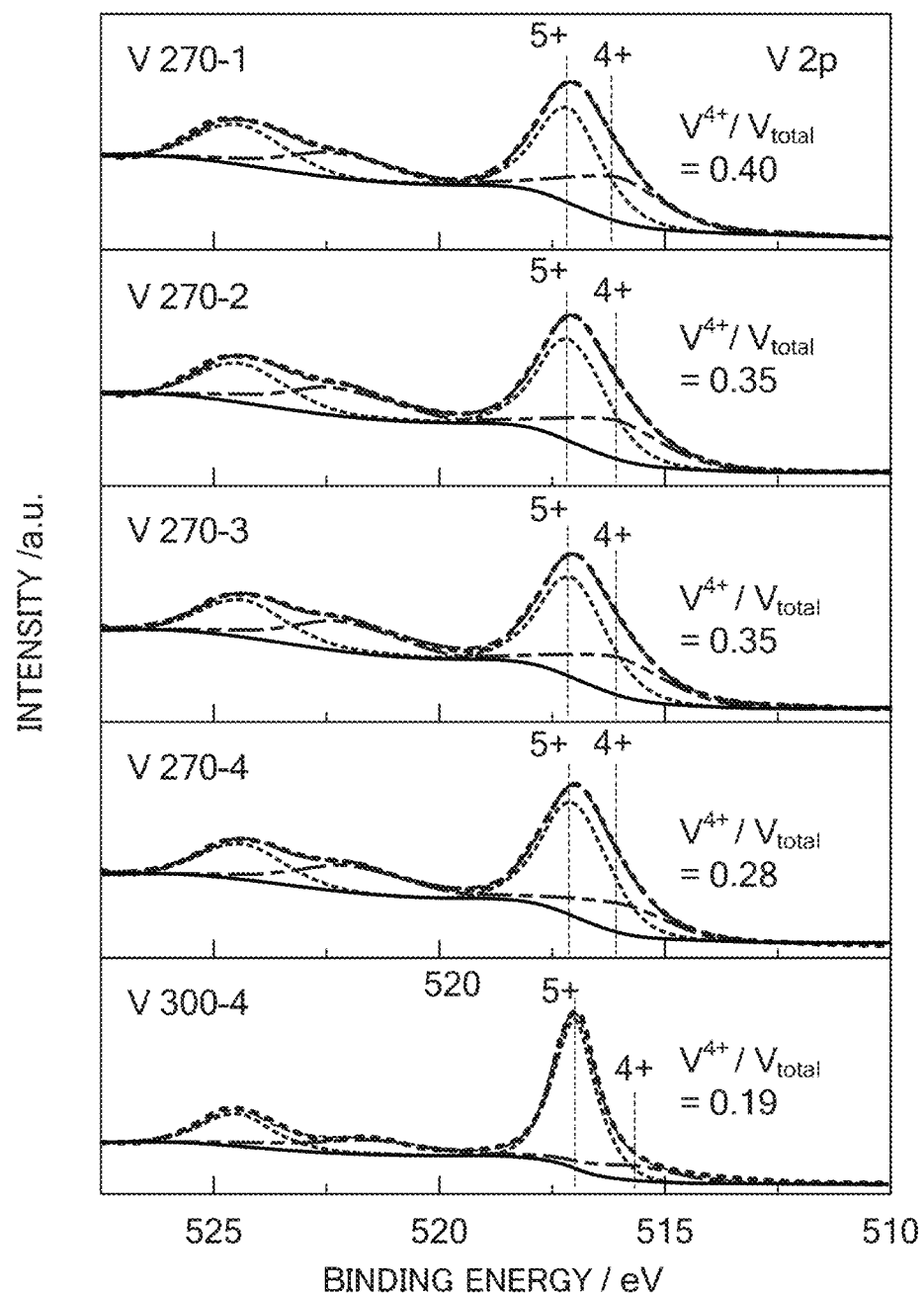
FIG. 12 is a graph showing the XPS spectra in the V2p region of the catalyst according to each of the Examples and Comparative Examples.

FIG. 12 shows the XPS spectra for the V2p region. From FIG. 12, it is shown that there is a defect portion and $V^{4+}$ site in the crystal structure of each catalyst according to the Examples, similarly to FIG. 8.

In addition, the ratio of tetravalent vanadium relative to overall vanadium from the catalyst surface until 2 nm which is the photoelectron escape depth becomes 0.40 in Example 1, 0.35 in Example 2, 0.35 in Example 3, and 0.28 in Example 4.

On the other hand, it was merely 0.19 in the Comparative Example.

Figure 13:
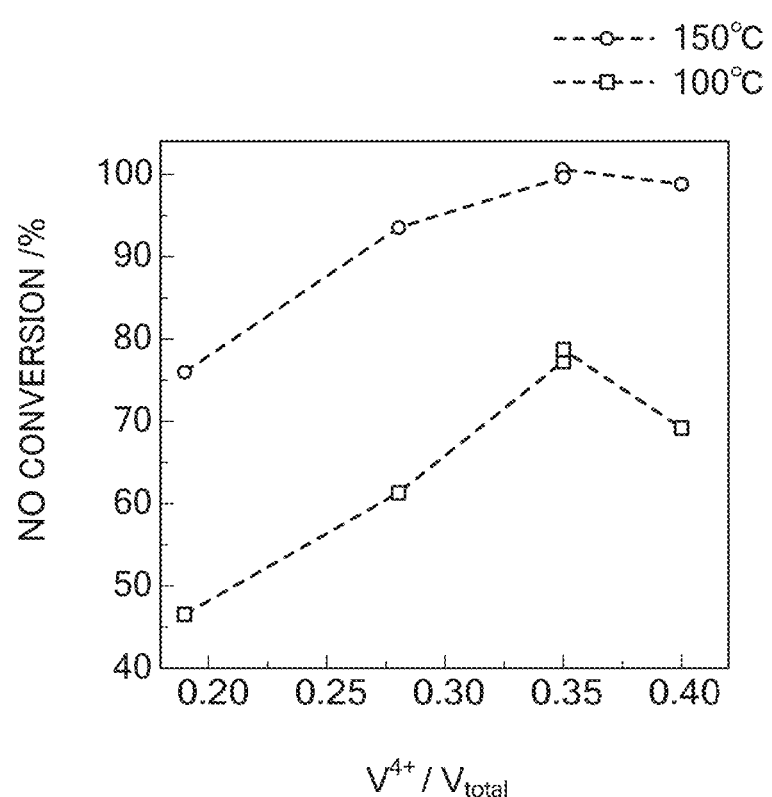
FIG. 13 is a graph establishing the proportion tetravalent vanadium in the overall vanadium of the surface of the catalysts according to each of the Examples and Comparative Examples as the horizontal axis and the NO conversion rate as the vertical axis.

FIG. 13 is a graph establishing the proportion of tetravalent vanadium in the overall vanadium of the catalyst surface of each of the Examples and Comparative Examples as the horizontal axis, and establishing the NO conversion rate as the vertical axis.

It was shown that the NO conversion rates of the catalysts according to the Examples in which the proportion of tetravalent vanadium of the overall vanadium of the catalyst surface was at least 0.20 is higher than the NO conversion rate of the catalyst according to the Comparative Example in which the proportion of tetravalent vanadium of the overall vanadium of the catalyst surface was 0.19.

In the above way, a denitration catalyst containing vanadium oxide has a high denitration efficiency at low temperatures of 270° C. or lower, in the selective catalytic reduction reaction with ammonia as the reductant, using a denitration catalyst having a defect site at which oxygen atoms are deficient in the crystal structure of vanadium pentoxide.

3 Application Examples

<3.1 Combustion System>
<3.1.1 First Combustion System>

Figure 14:
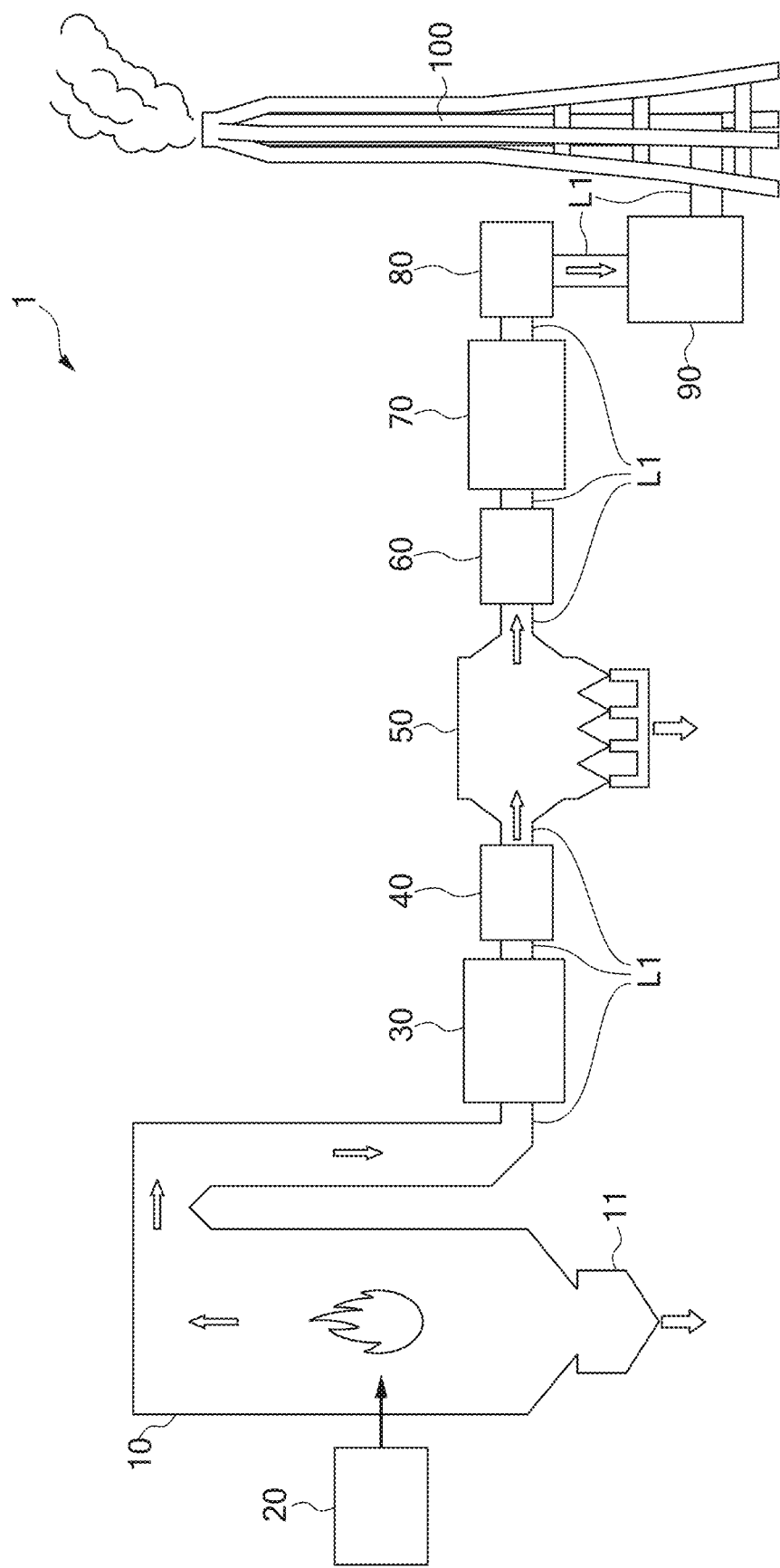
FIG. 14 is a view showing the configuration of a combustion system according to a first application example of the present invention.

Hereinafter, a first application example of the present invention will be explained while referencing the drawings. FIG. 14 is a view showing the configuration of a combustion system 1 according to the first application example.

The combustion system 1 is a combustion system establishing pulverized coal as the fuel.

As shown in FIG. 14, the combustion system 1 assumes a thermal power generation system as an example, and includes: a boiler 10 as a combustion device, a coal pulverizer 20, an exhaust channel L1, an air preheater 30, a gas heater 40 as a heat recovery device, a dust collector 50, an induced-draft fan 60, desulfurization equipment 70, a gas heater 80 as a heater, a denitration device 90, and a smoke stack 100.

The boiler 10 combusts the pulverized coal as fuel together with air.

In the boiler 10, exhaust gas is produced by the pulverized coal combusting.

It should be noted that coal ash such as clinker ash and fly ash is produced by pulverized coal combusting.

The clinker ash produced in the boiler 10 is discharged to the clinker hopper 11 arranged below the boiler 10, and is then carried to a coal ash collection silo which is not illustrated.

The boiler 10 is formed in a substantially reversed U-shape as a whole.

The exhaust gas produced in the boiler 10 moves in reverse U shape along the shape of the boiler 10.

The temperature of the exhaust gas near the outlet of the exhaust gas of the boiler 10 is 300 to 400° C., for example.

The coal pulverizer 20 forms pulverized coal by crushing coal supplied from the coal hopper which is not illustrated, into a fine particle size.

The coal pulverizer 20 preheats and dries the pulverized coal, by mixing the pulverized coal and air.

The pulverized coal formed in the coal pulverizer 20 is supplied to the boiler 10 by air being blown.

The exhaust channel L1 has an upstream side connected to the boiler 10.

The exhaust channel L1 is a flow path through which the exhaust gas produced in the boiler 10 flows.

The air preheater 30 is arranged in the exhaust channel L1.

The air preheater 30 performs heat exchange between the exhaust gas and air used for combustion fed from a pusher-type blower which is not illustrated, and recovers heat from the exhaust gas.

The air for combustion is supplied to the boiler 10 after being heated in the air preheater 30.

The gas heater 40 is arranged on the downstream side of the air preheater 30 in the exhaust channel L1.

Exhaust gas which was heat recovered in the air preheater 30 is supplied to the gas heater 40.

The gas heater 40 further recovers heat from the exhaust gas.

The dust collector 50 is arranged on the downstream side of the gas heater 40 in the exhaust channel L1.

The exhaust gas which was heat recovered in the gas heater 40 is supplied to the dust collector 50.

The dust collector 50 is a device which collects dust such as coal ash (fly ash) in the exhaust gas by applying voltage to electrodes.

Fly ash collected in the dust collector 50 is carried to a coal ash collection silo which is not illustrated.

The temperature of exhaust gas in the dust collector 50 is 80 to 120° C., for example.

The induced-draft fan 60 is arranged on the downstream side of the dust collector 50 in the exhaust channel L1.

The induced-draft fan 60 draws in exhaust gas from which fly ash was removed in the dust collector 50 from a first side and sends out to a second side.

The desulfurization equipment 70 is arranged on the downstream side of the induced-draft fan 60 in the exhaust channel L1.

The exhaust gas sent out from the induced-draft fan 60 is supplied to the desulfurization equipment 70.

The desulfurization equipment 70 removes sulfur oxides from the exhaust gas.

In detail, the desulfurization equipment 70 removes sulfur oxides from the exhaust gas, by absorbing sulfur oxides contained in the exhaust gas into a mixed solution, by spraying mixed solution (limestone slurry) of limestone and water to the exhaust gas.

The temperature of exhaust gas in the desulfurization device 70 is 50 to 120° C., for example.

The gas heater 80 is arranged on the downstream side of the desulfurization device 70 in the exhaust channel L1.

The exhaust gas from which the sulfur oxides were removed in the desulfurization equipment 70 is supplied to the gas heater 80.

The gas heater 80 heats the exhaust gas.

The gas heater 40 and gas heater 80 may be configured as gas-gas heaters performing heat exchange between exhaust gas flowing between the air preheater 30 and the dust collector 50 in the exhaust channel L1, and exhaust gas flowing between the desulfurization equipment 70 and denitration device 90 described later.

Above all, the gas heater 80 heats the exhaust gas up to a temperature suited to the denitration reaction of the denitration device 90 at a later stage.

The denitration device 90 is arranged on the downstream side of the gas heater 80 in the exhaust channel L1.

The exhaust gas heated in the gas heater 80 is supplied to the denitration device 90.

The denitration device 90 removes nitrogen oxides from the exhaust gas by way of the denitration catalyst.

The denitration device 90 uses a denitration catalyst containing vanadium oxide, having a carbon content of at least 0.05 wt %, and having a defect site at which an oxygen deficiency occurs in the crystal structure.

The temperature of exhaust gas in the denitration device 90 is 130 to 200° C., for example.

The denitration device 90 removes nitrogen oxides from exhaust gas by a selective catalytic reduction process.

According to the selective catalytic reduction process, it is possible to remove nitrogen oxides efficiently from exhaust gas, by generating nitrogen and water from the nitrogen oxides by reductant and the above-mentioned denitration catalyst.

The reductant used in the selective catalytic reduction process contains at least one of ammonia and urea.

In the case of using ammonia as the reductant, ammonia in any state of ammonia gas, liquid ammonia and ammonia aqueous solution may be used.

More specifically, the denitration device 90 can be a configuration which injects ammonia gas to the introduced exhaust gas, and then contacts this mixed gas with the denitration catalyst.

For this reason, the denitration device 90 includes one or a plurality of denitration catalyst layers, and these denitration catalyst layers may include a plurality of casings, a plurality of honeycomb catalysts accommodated in this plurality of casing, and a sealing member.

In more detail, the casing is configured from a square tubular metal member in which one end and the other end are open, and may be arranged so that the opened one end and other end are opposite in the flow path of the exhaust gas in the denitration reactor, i.e. so that exhaust gas flows inside of the casing.

In addition, the plurality of casings may be arranged to be connected in an abutted state so as to block the flow path of exhaust gas.

The honeycomb catalyst may be formed in a long shape (rectangular parallelepiped shape) in which a plurality of exhaust gas circulation holes extending in the longitudinal direction is formed, and may be arranged so that the extending direction of exhaust gas circulation holes follows the flow path of exhaust gas.

The smoke stack 100 has a downstream side of the exhaust channel L1 connected.

The exhaust gas from which nitrogen oxides were removed in the denitration device 90 is introduced to the smoke stack 100.

The exhaust gas introduced to the smoke stack 100 is effectively discharged from the top of the smoke stack 100 by the stack effect, by being heated by the gas heater 80.

In addition, by the exhaust gas being heated in the gas heater 80, it is possible to prevent water vapor from condensing above the smoke stack 100 and white smoke generating.

The temperature of exhaust gas near the outlet of the smoke stack 100 is 110° C., for example.

<3.1.2 Second Combustion System>

Figure 15:
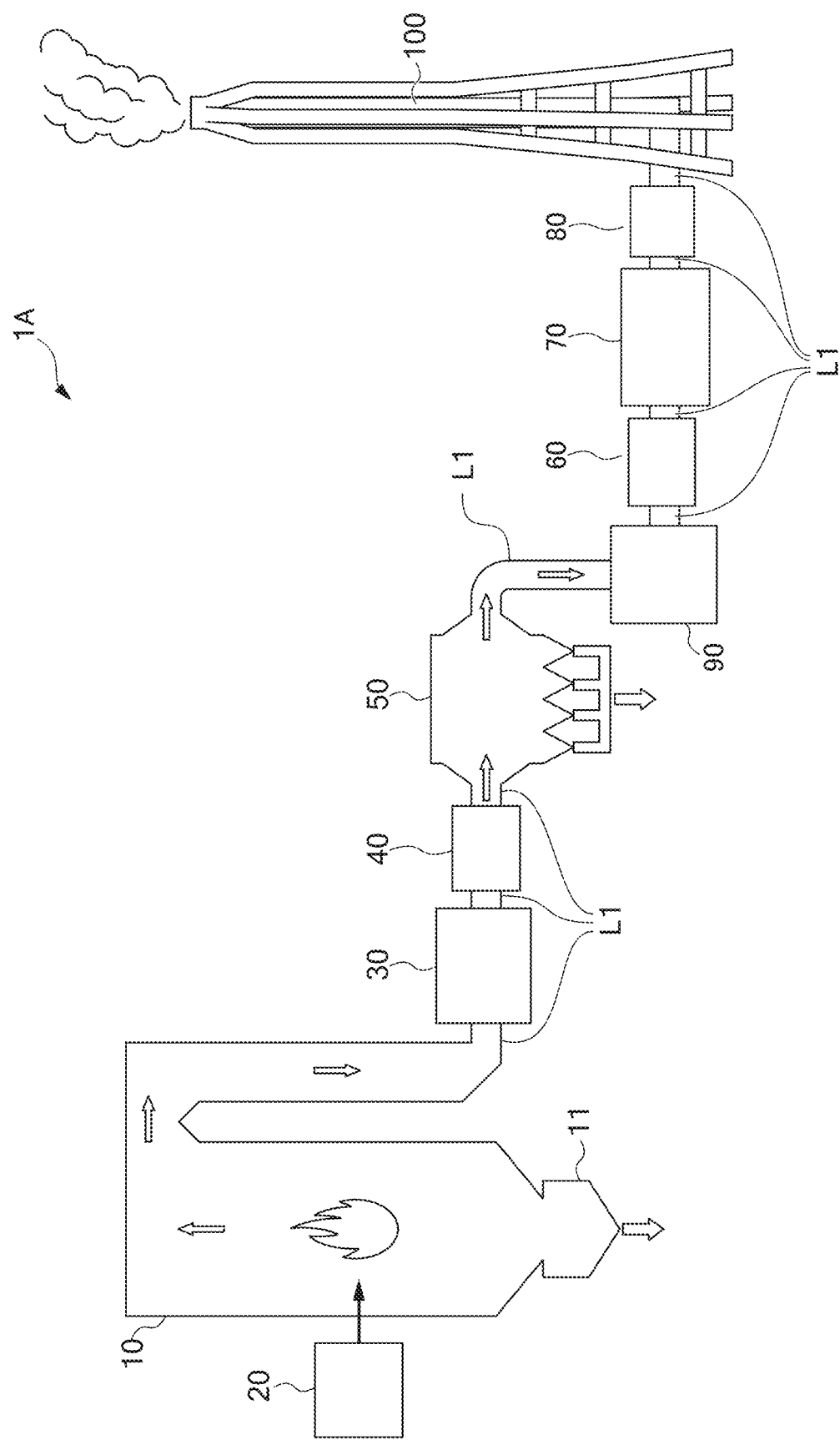
FIG. 15 is a view showing the configuration of a combustion system according to a second application example of the present invention.

FIG. 15 is a view showing the configuration of a combustion system 1A according to a second application example.

The combustion system LA is a combustion system establishing pulverized coal as fuel, similarly to the combustion system 1.

In the combustion system 1A, for constituent elements identical to the combustion system 1, the same reference numbers are used, and explanations of the functions thereof will be omitted.

The combustion system 1A differs from the combustion system 1 in the point of the denitration device 90 being installed immediately after the dust collector 50.

Furthermore, the induced-draft fan 60, desulfurization equipment 70, and a gas heater 80 are provided in order from upstream at the downstream of the denitration device 90.

The gas heater 80 in the combustion system 1 heats the exhaust gas up to the temperature suited to the denitration reaction of the denitration device 90 of a later stage.

On the other hand, the gas heater 80 of the combustion system 1A heats the exhaust gas up to the suitable temperature to diffuse from the smoke stack 100 at a later stage.

By installing the denitration device 90 immediately after the dust collector 50, it is possible to set the temperature of exhaust gas in the denitration device 90 as 130 to 200° C., without requiring to provide a gas heater before the denitration device 90.

<3.1.3 Third Combustion System>

Figure 16:
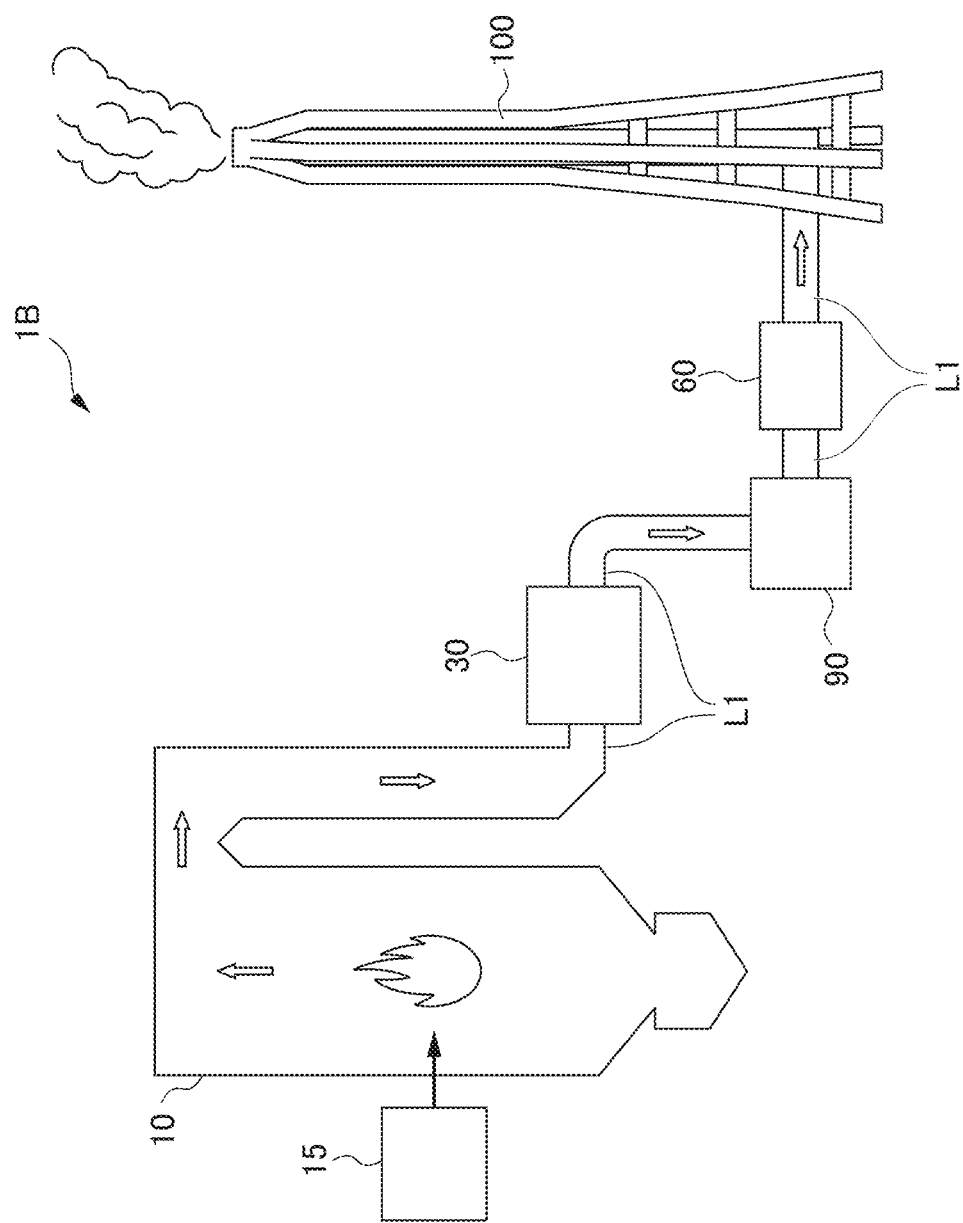
FIG. 16 is a view showing the configuration of a combustion system according to a third application example of the present invention.

FIG. 16 is a view showing the configuration of a combustion system 1B according to a third application example. The combustion system 1B differs from the combustion systems 1 and 1A, and is a combustion system establishing natural gas as the fuel.

In the combustion system 1B, for constituent elements identical to the combustion system 1 and the combustion system LA, the same reference numbers are used, and explanations of the functions thereof will be omitted.

As shown in FIG. 16, the combustion system 1B includes the boiler 10 as a combustion device, a vaporizer 15 of natural gas, the exhaust channel L1, the air preheater 30, the denitration device 90, the induced-draft fan 60, and the smoke stack 100.

On the other hand, the combustion system 1B does not establish the dust collector and desulfurization equipment as essential constituent elements.

The vaporizer 15 vaporizes natural gas supplied from an LNG tank which is not illustrated and supplies to the boiler 10.

Upon vaporizing, a system using seawater (open rack system) may be used, a system making hot water by heating with a gas burner (submerged combustion system) may be used, or a system performing heat exchange of a plurality of stages using a mediator may be used.

The denitration device 90 is arranged on the downstream side of the air preheater 30 in the exhaust channel L1. Exhaust gas cooled in the air preheater 30 is supplied to the denitration device 90.

The denitration device 90 removes nitrogen oxides from the exhaust gas by the denitration catalyst.

The temperature of each gas in the denitration device 90 is 130 to 200° C., for example.

The downstream side of the exhaust channel L1 is connected to the smoke stack 100.

Exhaust gas from which nitrogen oxides were removed in the denitration device 90 is introduced to the smoke stack 100.

Due to the temperature of the exhaust gas in the denitration device 90 being 130 to 200° C., for example, the exhaust gas introduced to the smoke stack 100 is effectively discharged from the top of the smoke stack 100 by the stack effect.

In addition, the temperature of exhaust gas near the outlet of the smoke stack 100 is 110° C., for example.

By arranging the denitration device 90 on the downstream side of the air preheater 30, the temperature of exhaust gas denitrated by the denitration catalyst becomes lower, and it becomes possible to decrease the deterioration of the denitration catalyst.

<3.1.4 Fourth Combustion System>

Figure 17:
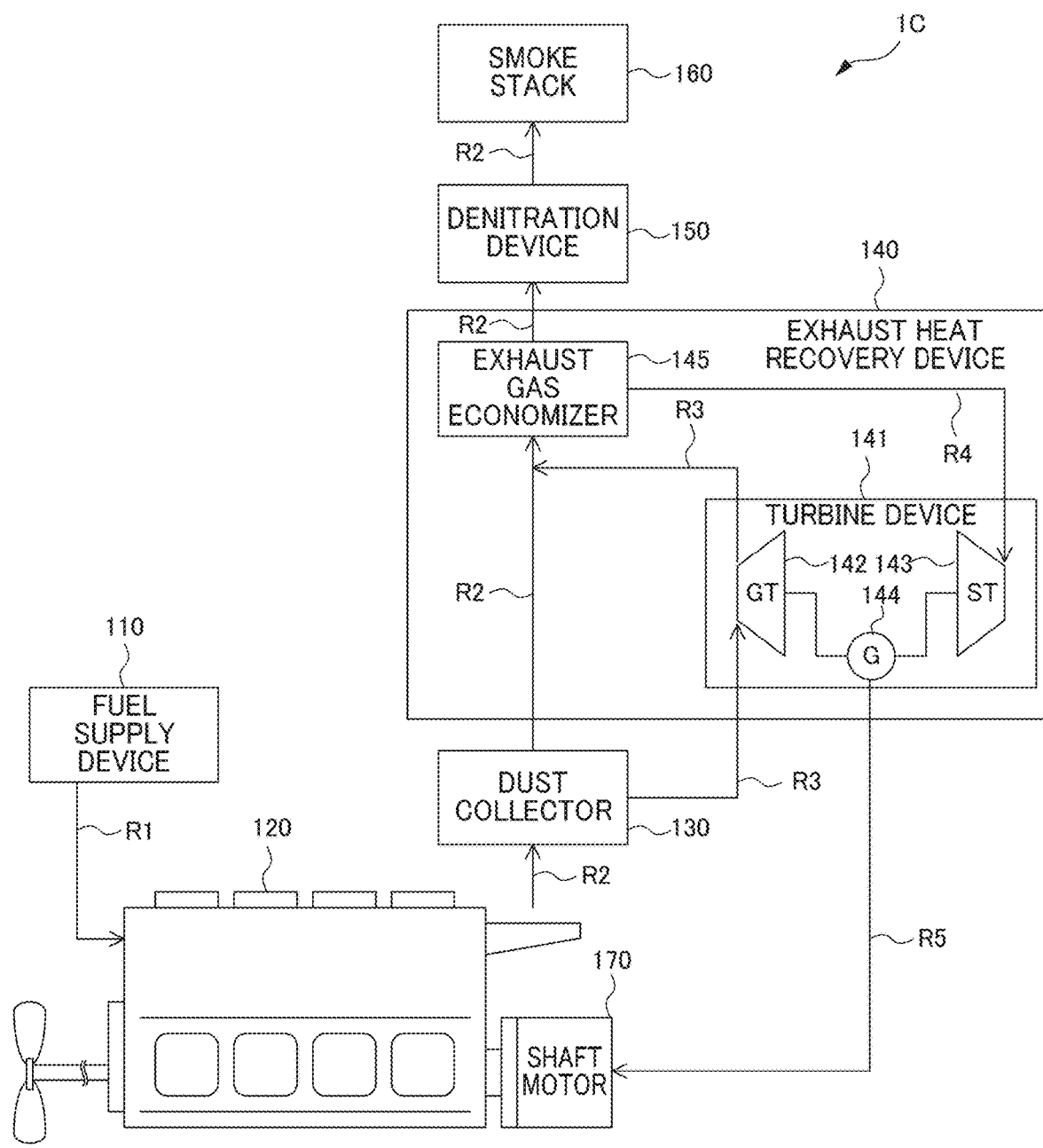
FIG. 17 is a view showing the configuration of a combustion system according to a fourth application example of the present invention.

FIG. 17 is a view showing the configuration of a combustion system 1C according to a fourth application example.

As shown in FIG. 20, the combustion system 1C is a combustion system used for the propulsion of ships, and includes: a fuel supply device 110, an internal combustion engine 120 as a combustion device, a dust collector 130, an exhaust recovery device 140, a denitration device 150, a smoke stack 160, a shaft motor 170, a fuel channel R1, exhaust channels R2 and R3, a steam channel R4, and a power line R5.

The fuel supply device 110 supplies fuel using the fuel channel R1 to the internal combustion engine 120.

As the fuel, for example, it is possible to use petroleum fuel such as light oil or heavy oil.

The fuel channel R1 has an upstream side connected to the fuel supply device 110, and a downstream side connected to the internal combustion engine 120.

The fuel channel R1 is a flow path to which fuel is transported from the fuel supply device 110 to the internal combustion engine 120.

The internal combustion engine 120 combusts the petroleum fuel together with air.

In the internal combustion engine 120, the exhaust gas is produced by the petroleum fuel combusting.

The produced exhaust gas is discharged to the dust collector 130 via the exhaust channel R2.

It should be noted that the internal combustion engine 120 may be a 2-stroke low-speed diesel engine used in a large ship, may be a 4-stroke high-speed diesel engine used in a ferry or the like, or may be a 4-stroke high-speed diesel engine used in a high-speed boat or small ship.

The exhaust channel R2 has an upstream side connected to the internal combustion engine 120.

The exhaust channel R2 is a flow path through which exhaust gas produced by the internal combustion engine 120 flows.

The dust collector 130 is arranged on the downstream side of the internal combustion engine 120 in the exhaust channel R2, and the exhaust gas discharged from the internal combustion engine 120 is supplied thereto.

The dust collector 130 is a device which collects ash dust in the exhaust gas.

As the ash dust collection method, for example, a method may be used which charges the ash dust by applying voltage to electrodes, and collects using Coulomb force.

Alternatively, a method may be used which collects ash dust by gas-liquid contact, by supplying a ash dust absorption liquid to a venturi portion, and atomizing the ash dust absorption liquid by exhaust gas which reaches high speed by this venturi portion, as in the method conducted by a venturi scrubber.

The exhaust heat recovery device 140 is arranged on the downstream side of the dust collector 130 in the exhaust channel, and exhaust gas from which ash dust was removed by the dust collector 130 is supplied thereto.

The exhaust heat recovery device 140 recovers exhaust heat from exhaust gas supplied from the dust collector 130.

More specifically, the exhaust heat recovery device 140 includes a turbine device 141 and exhaust gas economizer 145.

The turbine device 141 includes a gas turbine 142, steam turbine 143 and generator 144.

The gas turbine 142 and generator 144, and the steam turbine 143 and generator 144 are connected to each other.

The gas turbine 142 is driven by exhaust gas supplied from the dust collector 130 through the exhaust channel R3.

When the gas turbine 142 is driven, the generator 144 connected to the gas turbine 142 is also driven in connection to perform power generation.

In addition, the steam turbine 143 is driven by steam supplied from the exhaust gas economizer 145 described later, through the steam channel R4.

When the steam turbine 143 is driven, the generator 144 connected to the steam turbine 143 also operates in connection to perform power generation.

The electric power generated by the generator 144 is supplied to the shaft motor 170 through the power line R5.

The exhaust gas economizer 145 generates steam from water stored in a water supply tank (not illustrated), with the exhaust gas supplied from the dust collector 130 through the exhaust channel R2, and exhaust gas supplied from the gas turbine 142 through the exhaust channel R3 as the heat source.

The steam generated by the exhaust gas economizer 145 is supplied to the steam turbine 143 through the steam channel R4.

The exhaust channel R3 is a different exhaust channel than the exhaust channel R2, with the upstream side being connected to the dust collector 130 and the downstream side being connected to the exhaust gas economizer 145, and midstream thereof, goes through the gas turbine 142.

The exhaust channel R3 is a flow path which flows the exhaust gas supplied from the dust collector 130 to the exhaust gas economizer 145 through the gas turbine 142.

The steam channel R4 has an upstream side connected to the exhaust gas economizer 145, and a downstream side connected to the steam turbine 143.

The steam channel R4 is a flow path through which steam generated by the exhaust gas economizer 145 flows.

The power line R5 has an upstream side connected to the generator 144, and a downstream side connected to the shaft motor 170.

The power line is a flow path through which electricity generated by the generator 144 flows.

The denitration device 150 is arranged on the downstream side of the exhaust heat recovery device 140 in the exhaust channel R2, and the exhaust gas from which exhaust heat was recovered is supplied thereto.

The denitration device 150 removes nitrogen oxides from the exhaust gas by way of the denitration catalyst.

The denitration device 150 uses a denitration catalyst containing vanadium oxide, in which the carbon content is at least 0.05 wt %, and the above-mentioned denitration catalyst has a defect site at which an oxygen deficiency occurs in the crystal structure.

Since the denitration device 150 is installed on the downstream side of the exhaust heat recovery device 140, the temperature of exhaust gas in the denitration device 150 is 130 to 200° C., for example.

The denitration device 150 removes nitrogen oxides from exhaust gas by way of a selective catalytic reduction process.

According to the selective catalytic reduction process, it is possible to remove nitrogen oxides efficiently from exhaust gas, by generating nitrogen and water from the nitrogen oxides by way of a reductant and denitration catalyst.

The reductant used in the selective catalytic reduction process contains at least one of ammonia and urea.

In the case of using ammonia as the reductant, ammonia in any state of ammonia gas, liquid ammonia and ammonia aqueous solution may be used.

More specifically, the denitration device 150 can be a configuration which injects ammonia gas to the introduced exhaust gas, and then contacts this mixed gas with the denitration catalyst.

The smoke stack 160 is connected at a downstream side of the exhaust channel R2.

The exhaust gas from which nitrogen oxides have been removed in the denitration device 150 is introduced to the smoke stack 160.

The exhaust gas introduced to the smoke stack 160 is effectively discharged from the top of the smoke stack 160 by way of the stack effect, due to the temperature of the exhaust gas in the denitration device 150 being 130 to 200° C., for example.

In addition, it is possible to prevent water vapor from condensing above the smoke stack 160 and white smoke generating.

The temperature of the exhaust gas near the outlet of the smoke stack 160 is 110° C., for example.

The shaft motor 170 is installed on the downstream side of the generator 144 in the power line R5, and is driven so as to aid rotation around the propeller shaft of the internal combustion engine 120.

Electric power is supplied to the shaft motor 170 from the generator 144 through the power line R5, and by using this electric power, drives so as to aid the motive power generated by the internal combustion engine 120.

<3.1.5 Fifth Combustion System>

In addition, although not illustrated, a fifth application example may be a denitration device which equips, to a combustion system that incinerates raw garbage, etc., a denitration catalyst containing vanadium oxide, and having a carbon content of at least 0.05 wt %, and the above denitration catalyst having a defect site at which an oxygen deficiency occurs in the crystal structure.

In the denitration device installed at a later stage than the boiler combusting raw garbage, although the temperature of exhaust gas may be no more than 150° C., since the above-mentioned denitration catalyst can be used in denitration having a reaction temperature of 80 to 150° C., it is useful also for such a denitration system.

<3.2 Denitration Catalyst Made by Coating Catalyst Component on Substrate>

The above-mentioned denitration catalyst is basically powder form; however, for example, a honeycomb-type catalyst made by coating catalyst component on a honeycomb shape substrate may be used in a flue gas denitration apparatus installed at a thermal power plant, as disclosed in Japanese Unexamined Patent Application, Publication No. 2005-199108.

In the present invention, as a sixth application example, it is possible to coat the above-mentioned denitration catalyst as the catalyst component on a substrate.

So long as deformation, etc. does not occur at temperatures of 200° C. or higher, any substrate can be used as the above-mentioned substrate.

For example, ceramics, pottery and metals such as titanium may be used as the substrate.

Alternatively, as the substrate, a corrugated honeycomb filter made from a ceramic fiber paper, glass fiber paper, flame-retardant paper, activated carbon paper, deodorizing paper, honeycomb filter nonwoven fabric, felt, or plastic sheet may be used.

Alternatively, the catalyst component of the present invention may be further coated on a new catalyst or a used catalyst.

In addition, the substrate can be made into any form, and can be established as any among a plate-like shape, pellet shape, fluid form, columnar shape, star shape, ring shape, extruded shape, spherical shape, flake shape, pastille shape, rib extruded shape, or ribbed ring shape, for example.

For example, the corrugated honeycomb filter can assume any form such as block type, rotor type, diagonal type, deformed block, strip type and mini pleats.

<3.3 Denitration Catalyst Molded in Block Shape>

Furthermore, a catalyst block such as a honeycomb catalyst may be used in the denitration device equipped to a coal-fired power generation facility; however, in the present invention, it is possible to produce a catalyst block with the above-mentioned denitration catalyst as the catalyst component as a seventh application example, as disclosed in Japanese Unexamined Patent Application, Publication No. 2017-32215, for example.

More specifically, it is possible to produce the catalyst block by mixing and kneading 1 to 50 wt % of CMC (carboxymethyl cellulose) or PVA (polyvinyl alcohol), for example, as a binder to the above-mentioned denitration catalyst of powder form, extrusion molding by a molder such as a pellet mill or vacuum extruder, or press molding, then drying, followed by firing.

It should be noted that, upon firing, since the above-mentioned binder is burned off, the weight ratio of the above-mentioned denitration catalyst in the catalyst block after firing becomes 100 wt %.

In addition, it is possible to produce the catalyst block by, after further mixing titanium molybdenum, tungsten and/or other compounds (particularly oxides), or silica, etc. to the above-mentioned denitration catalyst of powder form, then kneading, and extrusion molding.

The catalyst block can assume any form, for example, and it is possible to make into plate-like shape, pellet shape, fluid form, columnar shape, star shape, ring shape, extruded shape, spherical shape, flake shape, honeycomb shape, pastille shape, rib extruded shape, or ribbed ring shape.

In addition, for example, the catalyst block of honeycomb shape may have a honeycomb surface which is a polygonal shape such as triangular, quadrilateral, pentagonal or hexagonal, or circular form.

<3.4 Other Applications>

As applications of the above-mentioned denitration catalyst, a combustion system is mentioned in 3.1, a denitration catalyst made by coating the denitration component on a substrate is mentioned in 3.2, and a denitration catalyst molded into block form is mentioned in 3.3; however, the applications of the denitration catalyst are not limited thereto.

For example, a combustion system with pulverized coal as the fuel is mentioned in 3.1.1 and 3.1.2, and a combustion system with natural gas as the fuel is mentioned in 3.1.3; however, the above-mentioned denitration catalyst may be used in a combustion system using oil or biomass fuel in place of pulverized coal or natural gas.

In addition, a combustion system used for the propulsion of ships was mentioned in 3.1.4; however, the above-mentioned denitration catalyst may be used in a combustion system used for propelling automobiles instead of ships.

According to the combustion system related to the above-mentioned application examples, the following effects are exerted.

(1) As mentioned above, the combustion system 1 according to the above application example arranged the denitration device 90 on the downstream side of the dust collector 50, in the exhaust channel L1 through which exhaust gas generated in the boiler (combustion device) 10 flows.

Furthermore, the above embodiment uses, in the denitration device 90, a denitration catalyst containing vanadium oxide, the vanadium oxide including vanadium pentoxide, and having defect sites at which oxygen atoms are deficient in the crystal structure of the vanadium pentoxide. By using the above-mentioned denitration catalyst, the combustion system 1 according to the above embodiment can exhibit an effect whereby the denitration efficiency at low temperature is even higher compared to the conventional technology, upon a selective catalytic reduction reaction with ammonia as the reductant.

(2) The combustion system 1A according to the above application example further includes the air preheater 30 which recovers heat from the exhaust gas, and the air preheater 30 is arranged on the upstream side of the dust collector 50.

By the exhaust gas which has been heat recovered by the air preheater 30 being supplied to the dust collector 50, the load on the dust collector 50 by the heat of exhaust gas can be suppressed.

In addition, since the denitration device 90 is not arranged upstream of the air preheater 30 which is normally arranged near the boiler (combustion device) 10 in the exhaust channel L1, clogging of the air preheater 30 caused by ammonium sulfate produced by ammonia and sulfur component in exhaust gas reacting will not occur.

The cost of operation of the combustion system 1A is thereby low.

(3) The combustion system 1B according to the above application example arranges the denitration device 90 on the downstream side of the air preheater 30, in the exhaust channel L1 through which exhaust gas produced in the boiler (combustion device) 10 flows.

Furthermore, the above-mentioned embodiment uses a denitration catalyst containing vanadium oxide in the denitration device 90, the vanadium oxide including vanadium pentoxide, and having defect sites at which oxygen atoms are deficient in the crystal structure of the vanadium pentoxide. By using the above-mentioned denitration catalyst, the combustion system 1A according to the above embodiment can exhibit an effect whereby the denitration efficiency at low temperature is even higher compared to the conventional technology, upon selective catalytic reduction reaction with ammonia as the reductant.

In addition, since it is thereby possible to arrange the denitration device 90 on the downstream side of the air preheater 30, the temperature of the exhaust gas denitrated by the denitration catalyst is lower, and it is possible to decrease deterioration of the denitration catalyst.

In addition, the combustion system 1 of the above embodiment does not establish the dust collector and desulfurization device as essential constituent elements.

Therefore, by simplifying the configuration of the combustion system 1B, it becomes possible to lower the installation cost.

(4) The combustion system 1C according to the above-mentioned application example includes: the exhaust channel R2 through which exhaust gas generated by fuel combusting in the internal combustion engine 120 flows; the exhaust heat recovery device 140 which is arranged in the exhaust channel R2 and recovers exhaust heat from the exhaust gas discharged from the internal combustion engine 120; and the denitration device 150 which is arranged in the exhaust channel R2 and removes nitrogen oxides from exhaust gas by way of the denitration catalyst, in which the denitration device 150 is arranged on the downstream side of the exhaust heat recovery device 140 in the exhaust channel R2, and the denitration catalyst contains vanadium oxide, the vanadium oxide includes vanadium pentoxide, and has a defect site at which oxygen atoms are deficient in the crystal structure of the vanadium pentoxide.

By using the above-mentioned denitration catalyst, the combustion system 1C according to the above embodiment can exhibit an effect whereby the denitration efficiency at low temperature is even higher compared to the conventional technology, upon selective catalytic reduction reaction with ammonia as the reductant.

Furthermore, immediately before introducing exhaust gas to the denitration device 150, it is not essential to heat the exhaust gas. Since the denitration catalyst is thereby no longer exposed to high temperatures, the deterioration of denitration catalyst is decreased, and the cost of operation of the combustion system 1C becomes lower. In addition, the combustion system 1C of the above embodiment can be made a more compact configuration by the amount by which heaters for warming the exhaust gas are not essential.

It thereby becomes possible to install the combustion system with a denitration device in a narrow space such as that of a ship.

(5) As mentioned above, it is preferable for the exhaust heat recovery device 140 to include the turbine device 141 and exhaust gas economizer 145, in which the exhaust gas economizer 145 produces steam with exhaust gas discharged from the internal combustion engine 120 and exhaust gas supplied from the turbine device 141 as heat sources, and the turbine device 141 conducts power generation using the exhaust gas discharged from the internal combustion engine 120 and steam supplied from the exhaust gas economizer 145.

The exhaust heat recovery device 140 in the above embodiment can more effectively use the heat energy generated by combustion of fuel in the internal combustion engine 120, by including the turbine device 141 and exhaust gas economizer 145.

EXPLANATION OF REFERENCE NUMERALS 1, 1A, 1B, 1C combustion system
10 boiler
15 vaporizer
30 air preheater
50 electrostatic precipitator
90, 150 denitration device
100, 160 smoke stack
110 fuel supply device
120 internal combustion engine
130 dust collector
140 exhaust heat recovery device
141 turbine device
145 exhaust gas economizer
170 shaft motor

The invention claimed is:

1. A combustion system comprising:
a combustion device which combusts a fuel;
an exhaust channel through which exhaust gas generated by the fuel combusting in the combustion device flows;
a dust collector which is disposed in the exhaust channel, and collects ash dust in the exhaust gas; and
a denitration device which is disposed in the exhaust channel, and removes nitrogen oxides from the exhaust gas by way of a denitration catalyst,
wherein the denitration device is disposed on a downstream side of the dust collector in the exhaust channel, and
wherein the denitration catalyst contains vanadium oxide, the vanadium oxide including vanadium pentoxide, and the denitration catalyst has a defect site at which oxygen atoms are deficient in a crystal structure of the vanadium pentoxide;
wherein the defect site at which oxygen atoms are deficient includes an intensity ratio of peak intensity ($P_{6-13}$) on the (110) plane of $V_6O_{13}$, relative to the peak intensity ($P_{2-5}$) on the (001) plane of $V_2O_5$, detected by powder X-ray diffraction method, being at least 0.08 and no more than 2.05.

2. The combustion system according to claim 1, wherein the combustion system further includes an air preheater disposed in the exhaust channel, and recovers heat from the exhaust gas, and
wherein the air preheater is disposed on an upstream side of the dust collector.

3. A combustion system comprising:
a combustion device which combusts a fuel;
an exhaust channel through which exhaust gas generated by the fuel combusting in the combustion device flows;
an air preheater which is disposed in the exhaust channel, and recovers heat from the exhaust gas; and
a denitration device which is disposed in the exhaust channel, and removes nitrogen oxides from the exhaust gas by way of a denitration catalyst,
wherein the denitration device is disposed on a downstream side of the air preheater in the exhaust channel, and
wherein the denitration catalyst contains vanadium oxide, the vanadium oxide including vanadium pentoxide, and the denitration catalyst has a defect site at which oxygen atoms are deficient in a crystal structure of the vanadium pentoxide;
wherein the defect site at which oxygen atoms are deficient includes an intensity ratio of peak intensity ($P_{6-13}$) on the (110) plane of $V_6O_{13}$, relative to the peak intensity ($P_{2-5}$) on the (001) plane of $V_2O_5$, detected by powder X-ray diffraction method, being at least 0.08 and no more than 2.05.

4. A combustion system comprising:
an internal combustion engine which combusts a fuel;
an exhaust channel through which exhaust gas generated by the fuel combusting in the internal combustion engine flows;

an exhaust heat recovery device which is disposed in the exhaust channel and recovers exhaust heat from exhaust gas discharged from the internal combustion engine; and a denitration device which is disposed in the exhaust channel, and removes nitrogen oxides from the exhaust gas by way of a denitration catalyst, wherein the denitration device is disposed on a downstream side of the exhaust heat recovery device in the exhaust channel, and wherein the denitration catalyst contains vanadium oxide, the vanadium oxide including vanadium pentoxide, and the denitration catalyst has a defect site at which oxygen atoms are deficient in a crystal structure of the vanadium pentoxide;

wherein the defect site at which oxygen atoms are deficient includes an intensity ratio of peak intensity ($P_{6-13}$) on the (110) plane of $V_6O_{13}$ relative to the peak intensity ($P_{2-5}$) on the (001) plane of $V_2O_5$, detected by powder X-ray diffraction method, being at least 0.08 and no more than 2.05.

5. The combustion system according to claim 4, wherein the exhaust heat recovery device includes a turbine device and an exhaust gas economizer, wherein the exhaust gas economizer generates steam with exhaust gas discharged from the internal combustion engine and exhaust gas supplied from the turbine device as heat sources, and wherein the turbine device conducts power generation using the exhaust gas discharged from the internal combustion engine and steam supplied from the exhaust gas economizer.

* * * * *